United States Patent
Sakai et al.

(10) Patent No.: US 10,701,330 B2
(45) Date of Patent: Jun. 30, 2020

(54) INFORMATION PROCESSING APPARATUS THAT PERFORMS AUTO WHITE BALANCE IF ADDITIONAL INFORMATION IS NOT EXTRACTED FROM A CAPTURED IMAGE, INFORMATION PROCESSING SYSTEM, INFORMATION PROCESSING METHOD, AND STORAGE MEDIUM

(71) Applicant: CANON KABUSHIKI KAISHA, Tokyo (JP)

(72) Inventors: Hiroyuki Sakai, Chigasaki (JP); Mitsuru Uratani, Kawasaki (JP); Yuki Ishida, Kawasaki (JP); Yuki Omagari, Tokyo (JP); Tomohiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/554,879

(22) Filed: Aug. 29, 2019

(65) Prior Publication Data

US 2019/0387207 A1 Dec. 19, 2019

Related U.S. Application Data

(63) Continuation of application No. 16/013,371, filed on Jun. 20, 2018, now Pat. No. 10,447,984.

(30) Foreign Application Priority Data

Jun. 28, 2017 (JP) ................................ 2017-126764

(51) Int. Cl.
*H04N 9/73* (2006.01)
*H04N 5/225* (2006.01)
(Continued)

(52) U.S. Cl.
CPC ............ *H04N 9/735* (2013.01); *H04N 1/4052* (2013.01); *H04N 1/6022* (2013.01); *H04N 1/6077* (2013.01); *H04N 5/2256* (2013.01)

(58) Field of Classification Search
CPC .... H04N 9/735; H04N 1/4052; H04N 1/6022; H04N 1/6077; H04N 5/2256;
(Continued)

(56) References Cited

U.S. PATENT DOCUMENTS 6,741,758 B2 5/2004 Hayashi et al.
6,959,385 B2 10/2005 Murakami et al.
(Continued)

FOREIGN PATENT DOCUMENTS

JP 4645758 3/2011

*Primary Examiner* — Nicholas G Giles
(74) *Attorney, Agent, or Firm* — Venable LLP

(57) ABSTRACT

An image capturing unit captures an image including an embedded image that is printed on the basis of image data in which at least a color component has been modulated according to additional information. An adjustment unit adjusts a white balance of the image captured by the image capturing unit on the basis of an adjustment value associated with the embedded image. A processing unit processes image data of the image captured by the image capturing unit whose white balance has been adjusted by the adjustment unit to read the additional information in the image captured by the image capturing unit.

16 Claims, 18 Drawing Sheets

(51) Int. Cl.
*H04N 1/60* (2006.01)
*H04N 1/405* (2006.01)

(58) Field of Classification Search
CPC ........... H04N 1/32144; H04N 1/32149; H04N 1/32352; H04N 1/32187
See application file for complete search history.

(56) References Cited

U.S. PATENT DOCUMENTS

| | | |
|---|---|---|
| 7,142,689 B2 | 11/2006 | Hayashi et al. |
| 9,509,882 B2* | 11/2016 | Reed ................. G06T 1/005 |
| 2016/0080603 A1* | 3/2016 | Miyake .............. H04N 1/32352 |
| | | 358/3.28 |
| 2016/0156805 A1* | 6/2016 | Reed ................. G06T 1/005 |
| | | 382/100 |
| 2018/0189853 A1* | 7/2018 | Stewart .............. G06Q 30/0621 |
| 2019/0005601 A1 | 1/2019 | Ishida et al. |
| 2019/0007579 A1* | 1/2019 | Uratani .............. G06K 9/00442 |
| 2019/0007667 A1* | 1/2019 | Sakai .................. H04N 1/4052 |

\* cited by examiner

COLOR CORRECTION TABLE

| (R,G,B) | DeviceRGB(R,G,B) |
|---|---|
| (0,0,0) | (0,0,0) |
| (0,0,16) | (0,0,10) |
| (0,0,32) | (0,3,28) |
| ⋮ | ⋮ |
| ⋮ | ⋮ |
| (255,255,240) | (248,255,230) |
| (255,255,255) | (255,255,255) |

FIG.5

COLOR SEPARATION TABLE

| (R,G,B) | (C,M,Y,K) |
|---|---|
| (0,0,0) | (0,0,0,255) |
| (0,0,16) | (18,16,0,246) |
| (0,0,32) | (33,31,0,224) |
| ⋮ | ⋮ |
| ⋮ | ⋮ |
| (255,255,240) | (0,0,15,0) |
| (255,255,255) | (0,0,0,0) |

FIG.7

| 0  | 0  | 0  | -1 | -1 |
|----|----|----|----|----|
| 0  | -1 | -1 | 2  | 2  |
| -1 | 2  | 2  | -1 | -1 |
| 2  | -1 | -1 | 0  | 0  |
| -1 | 0  | 0  | 0  | 0  |

FIG.12A

| 0  | 0  | -1 | 2  | -1 |
|----|----|----|----|----|
| 0  | 0  | -1 | 2  | -1 |
| 0  | -1 | 2  | -1 | 0  |
| 0  | -1 | 2  | -1 | 0  |
| -1 | 2  | -1 | 0  | 0  |

FIG.12B

INFORMATION PROCESSING APPARATUS THAT PERFORMS AUTO WHITE BALANCE IF ADDITIONAL INFORMATION IS NOT EXTRACTED FROM A CAPTURED IMAGE, INFORMATION PROCESSING SYSTEM, INFORMATION PROCESSING METHOD, AND STORAGE MEDIUM

CROSS-REFERENCE TO RELATED APPLICATIONS

This application is a Continuation of U.S. patent application Ser. No. 16/013,371, filed Jun. 20, 2018, which claims the benefit of Japanese Patent Application No. 2017-126764, filed Jun. 28, 2017, the entire disclosures of which are both hereby incorporated by reference.

BACKGROUND OF THE INVENTION

Field of the Invention

The present invention relates to an information processing apparatus, an information processing system, an information processing method, and a storage medium that extract additional information embedded in a print image.

Description of the Related Art

Japanese Patent No. 4645758 discloses a technique which embeds additional information (electronic watermark information) in image data of an image captured by an electronic camera and detects the additional information from the image data having the additional information embedded therein using a computer for image processing.

In a case where the additional information is embedded, it is preferable that the additional information is embedded by a modulation of color such that the additional information is hardly visually recognized. In a case where the image in which the additional information has been embedded by the modulation of color is printed, the printed image is captured by an information processing apparatus, such as a camera-equipped portable terminal, and the additional information is extracted from the captured image, there is a concern that the color of the captured image will be changed by the information processing apparatus. Specifically, in a case where the information processing apparatus adjusts the white balance of the captured image according to a capturing environment (imaging environment), the color of the captured image is changed by the adjustment value. The same problem occurs in a case where an auto white balance adjustment function that automatically adjusts the white balance according to the capturing environment is used. In a case where the color of the captured image is changed, there is a concern that the additional information embedded by the modulation of color will not be extracted.

SUMMARY OF THE INVENTION

The invention provides an information processing apparatus, an information processing system, an information processing method, and a storage medium that can accurately extract additional information from a captured image in which the additional information has been embedded by a modulation of color.

In the first aspect of the present invention, there is provided an information processing apparatus comprising:

an image capturing unit configured to capture an image including an embedded image that is printed on the basis of image data in which at least a color component has been modulated according to additional information;

an adjustment unit configured to adjust a white balance of the image captured by the image capturing unit on the basis of an adjustment value associated with the embedded image; and a processing unit configured to process image data of the image captured by the image capturing unit whose white balance has been adjusted by the adjustment unit to read the additional information in the image captured by the image capturing unit.

In the second aspect of the present invention, there is provided an information processing apparatus comprising:

an image capturing unit configured to capture an image including an embedded image that is printed on the basis of image data in which at least a color component has been modulated according to additional information;

a light source configured to illuminate the image captured by the image capturing unit;

an adjustment unit configured to adjust a white balance of the image captured by the image capturing unit, the adjustment unit having an auto white balance adjustment function that automatically adjusts a white balance according to a capturing environment of the image capturing unit; and a processing unit configured to process image data of the image captured by the image capturing unit whose white balance has been adjusted by the adjustment unit to read the additional information in the image captured by the image capturing unit, wherein the adjustment unit adjusts a white balance of the embedded image captured by the image capturing unit on the basis of an adjustment value corresponding to a color temperature of the light source, without using the auto white balance adjustment function.

In the third aspect of the present invention, there is provided an information processing system comprising:

the information processing apparatus according to the first aspect of the present invention; and a forming apparatus that makes a printed matter in which the embedded image has been printed.

In the fourth aspect of the present invention, there is provided an information processing method comprising:

a step of capturing an image including an embedded image that is printed on the basis of image data in which at least a color component has been modulated according to additional information;

a step of adjusting a white balance of the image captured by the capturing step on the basis of an adjustment value associated with the embedded image; and a step of processing image data of the image captured by the capturing step whose white balance has been adjusted by the adjusting step, and reading the additional information in the image captured by the capturing step.

In the fifth aspect of the present invention, there is provided a non-transitory computer-readable storage medium storing a program which causes a computer to execute an information processing method, the information processing method comprising:

a step of capturing an image including an embedded image that is printed on the basis of image data in which at least a color component has been modulated according to additional information;

a step of adjusting a white balance of the image captured by the capturing step on the basis of an adjustment value associated with the embedded image; and a step of processing image data of the image captured by the capturing step whose white balance has been adjusted by the adjusting step, and reading the additional information in the image captured by the capturing step.

According to the present invention, an image in which additional information has been embedded by a modulation color is captured and white balance of the captured image is optimally adjusted on the basis of an adjustment value associated with the image in which the additional information has been embedded. Therefore, it is possible to extract the additional information with high accuracy.

Further features of the present invention will become apparent from the following description of exemplary embodiments with reference to the attached drawings.

BRIEF DESCRIPTION OF THE DRAWINGS

FIG. 5 is a diagram illustrating an example of a color correction table illustrated in FIG. 3;

FIG. 7 is a diagram illustrating an example of a color separation table illustrated in FIG. 3;

FIGS. 12A and 12B are diagrams illustrating patterns obtained by quantifying the mask patterns illustrated in FIGS. 9A and 9B, respectively;

DESCRIPTION OF THE EMBODIMENTS

Hereinafter, embodiments of the invention will be described with reference to the drawings.

First Embodiment

An information processing system according to a first embodiment of the present invention includes a multiplexing encoding processing unit that embeds additional information in image information and a multiplexing decoding processing unit that extracts the additional information from a captured image. Hereinafter, the basic configuration of the information processing system and the characteristic configuration of the information processing system (particularly, the configuration of the multiplexing decoding processing unit) will be separately described.

(1) Basic Configuration (1-1) Hardware of Multiplexing Encoding Processing Unit

Figure 1A:
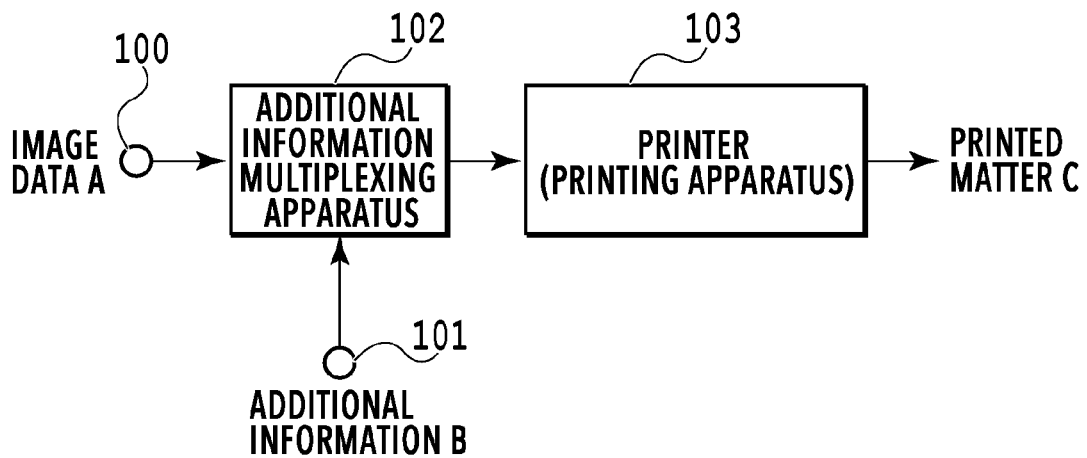
FIGS. 1A and 1B are diagrams illustrating different basic configurations of a multiplexing encoding processing unit in a first embodiment of the present invention.
Figure 1B:
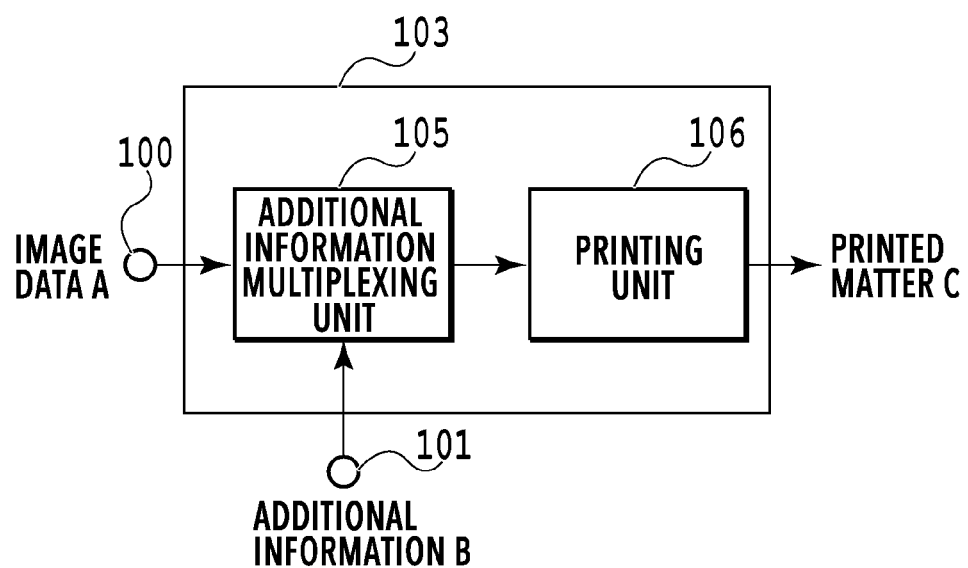

FIGS. 1A and 1B are diagrams illustrating examples of the configuration of multiplexing encoding hardware (multiplexing encoding processing unit) that embeds additional information (also referred to as "multiplexed information" and "embedded information") in image information in the information processing system. The hardware obtains image data (image information) A and additional data (additional information) B and generates a printed matter C in which the information items A and B have been embedded. The hardware illustrated in FIG. 1A is configured such that a process of embedding the additional information B in the image data A is performed by an apparatus different from a printer (printing apparatus). The hardware illustrated in FIG. 1B is configured such that the process of embedding the additional information B in the image data A is performed in the printer (printing apparatus).

In the configuration illustrated in FIG. 1A, the image data A input from an input terminal 100 is multi-gradation image data including a color component. The additional information B input from an input terminal 101 is, for example, text document data, audio data, moving image data, data obtained by compressing text document information, audio information, an image, and moving image information, and other binary data. An additional information multiplexing apparatus 102 performs a process of embedding the additional information B in the image data A (also referred to as a "multiplexing process" and an "embedment process"), which will be described below. A printer (printing apparatus) 103 performs a printing operation based on the image data A having the additional information B embedded therein to generate the printed matter C.

In the configuration illustrated in FIG. 1B, an additional information multiplexing unit 105 corresponding to the additional information multiplexing apparatus 102 illustrated in FIG. 1A is included in the printer 103. Similarly to the configuration illustrated in FIG. 1A, the image data A is input from the input terminal 100 and the additional information B is input from the input terminal 101. The additional information multiplexing unit 105 in the printer 103 performs a process of embedding the additional information B in the image data A. In addition, a printing unit 106 provided in the printer 103 performs a printing operation based on the image data A having the additional information B embedded therein to generate the printed matter C. As such, the process of generating the printed matter C on the basis of the image data A having the additional information B embedded therein is referred to as a "multiplexing encoding process".

Figure 2:
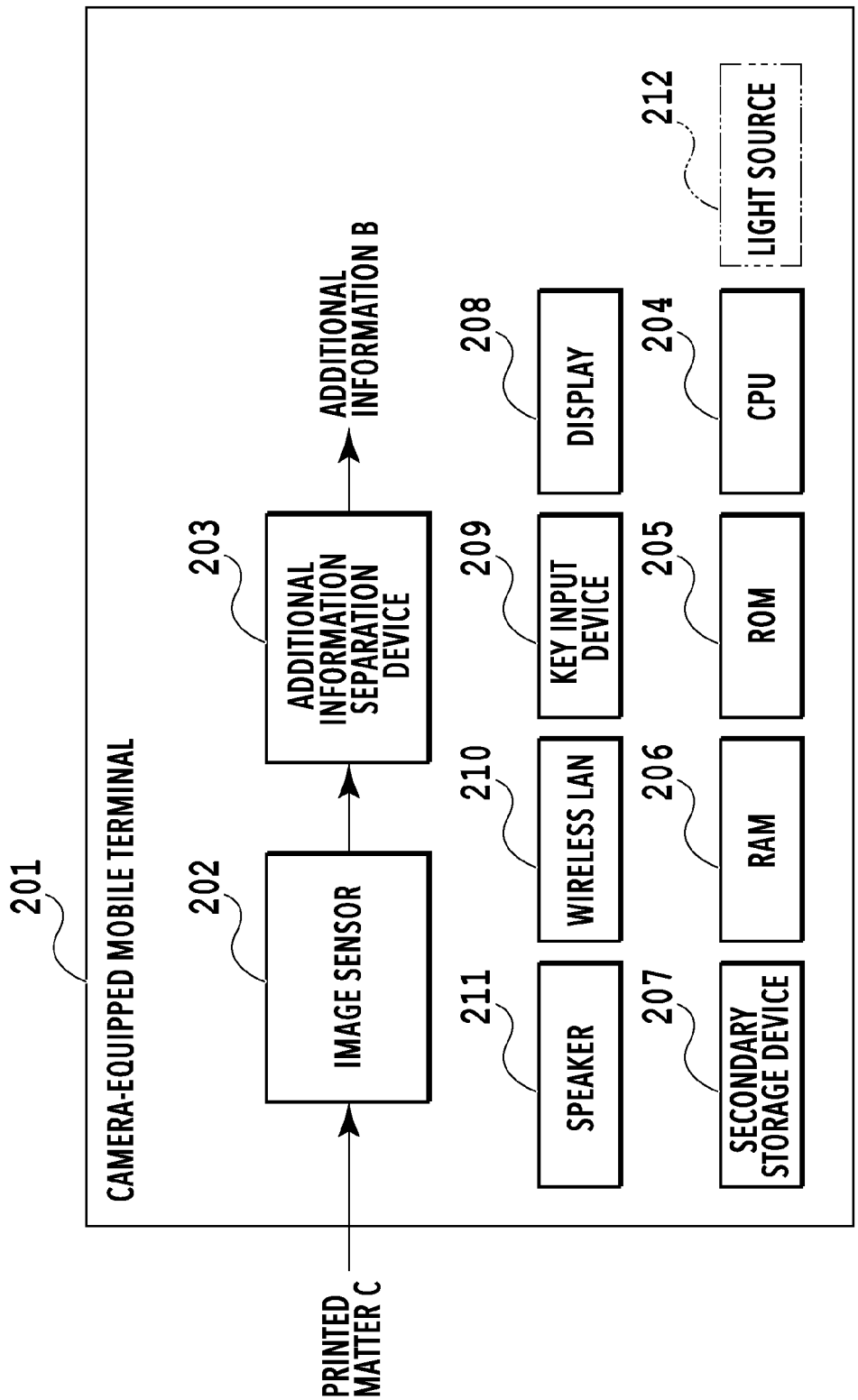
FIG. 2 is a diagram illustrating a basic configuration of a multiplexing decoding processing unit in the first embodiment of the present invention.

FIG. 2 is a diagram illustrating an example of the configuration of multiplexing decoding hardware (multiplexing decoding processing unit) in the information processing system for extracting the additional information B from the image information printed on the printed matter C. The hardware captures an image of the printed matter C subjected to the multiplexing encoding process, using an image capturing apparatus such as a camera, and analyzes the captured image to extract the additional information B embedded in the image (also referred to as a "reading process", a "separation process", and an "extraction process").

In FIG. 2, a camera-equipped mobile terminal (information processing apparatus) 201 having an image sensor 202 has a function of capturing (imaging) the image of the printed matter C. An additional information separation device 203 analyzes the image captured by the image sensor 202 to extract the additional information B as described later. A central processing unit (CPU) 204 executes an information processing method according to a program and a ROM 205 stores programs executed by the CPU 204. A RAM 206 functions as a memory for temporarily storing various kinds of information in a case where the CPU 204 executes a program. A secondary storage device 207, such as a hard disk, stores, for example, a database including image files and the analysis results of images. A display 208 presents, for example, the processing results of the CPU 204 to a user. A key input device 209 receives a process command and characters input by a touch panel operation using the display 208 with a touch panel function. A wireless local area network (LAN) 210 is connected to an Internet and accesses a site connected to the Internet such that a screen of the site is displayed on the display 208. The wireless LAN 210 is also used to transmit and receive data. A speaker 211 outputs a sound in a case where the extracted additional information is audio data or moving image data with a sound. In addition, in a case where the connection destination of the Internet has moving image data, a sound is output at the time of the reproduction of the moving image data.

The camera-equipped mobile terminal 201 is not limited to the configuration including the image sensor 202. For example, an apparatus different from the camera-equipped mobile terminal 201 may control the image sensor 202 such that the captured image is transmitted to the additional information separation device 203. For example, a digital camera and a video camera may be used as the image sensor 202. For example, a personal computer and a smart phone may be used as the additional information separation device 203 to extract the additional information B from the printed matter C. Hereinafter, a method for extracting the additional information B from the printed matter C is referred to as a "multiplexing decoding process".

(1-2) Firmware Configuration for Multiplexing Encoding Process

Figure 3:
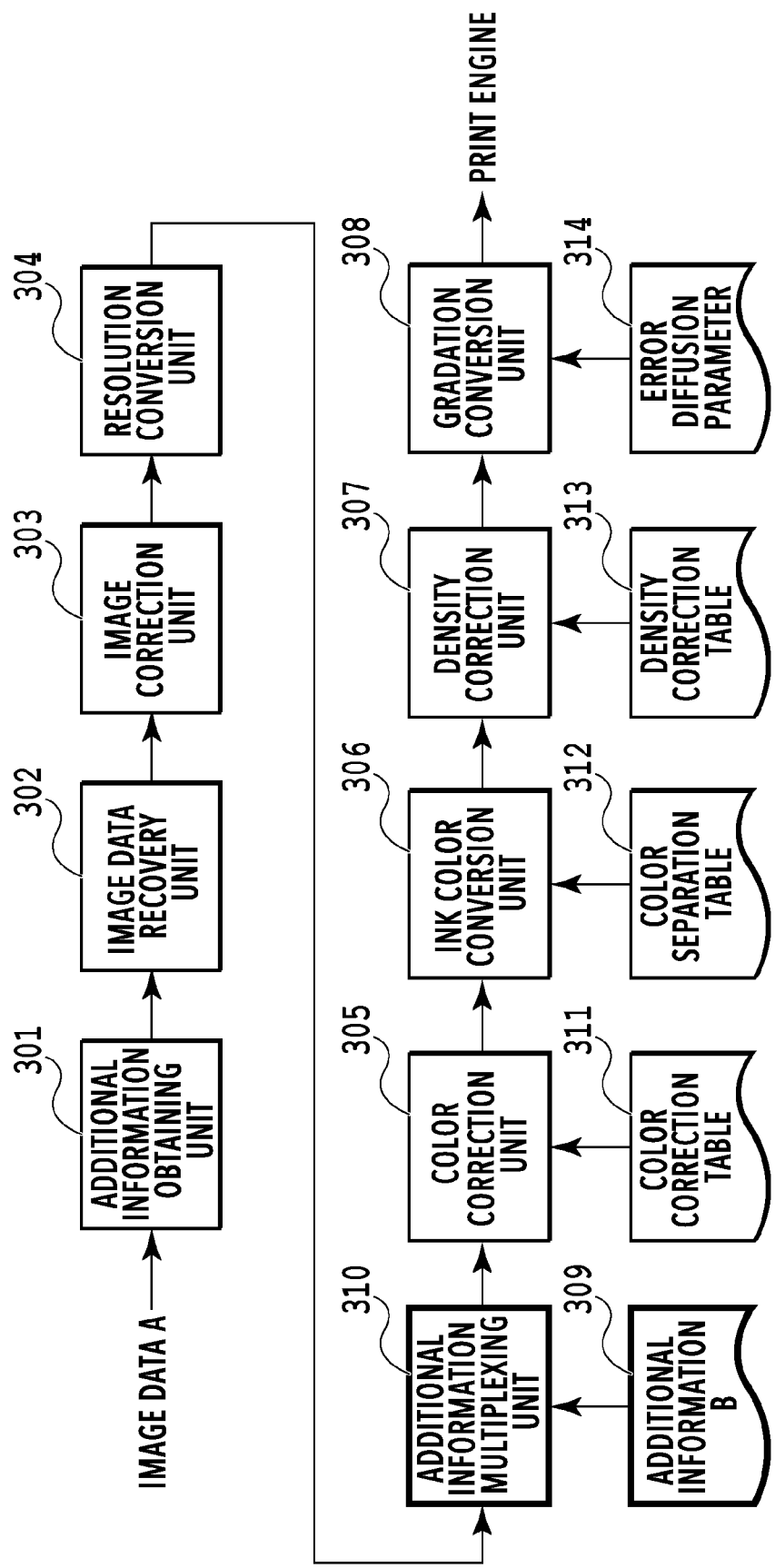
FIG. 3 is a block diagram illustrating the multiplexing encoding processing unit illustrated in FIGS. 1A and 1B.

FIG. 3 is a block diagram illustrating a basic firmware configuration for the multiplexing encoding process. Image data is converted by the following process into data with resolution and a gradation value that can be received by a print engine connected to a print head, and is transmitted to the print engine.

(1-2-1) Accessory Information Obtaining Unit

An accessory information obtaining unit 301 obtains various parameters which are used to compress image data. The obtained various parameters are transmitted to an image data recovery unit 302 and are used to extract the image data from a compressed image. In addition, the obtained various parameters are used for a process for calculating the degree of compression. For example, an input image is irreversible image data obtained by compressing document data in a JPEG format and is printed on a print medium. The irreversible image data includes a quantization table and an image data size used during compression. The obtained image data size information and quantization table are transmitted to the image data recovery unit 302.

(1-2-2) Image Data Recovery Unit

The image data recovery unit 302 decodes the encoded image data to extract the image data. In the following description, it is assumed that the input image is a JPEG image.

Figure 4:
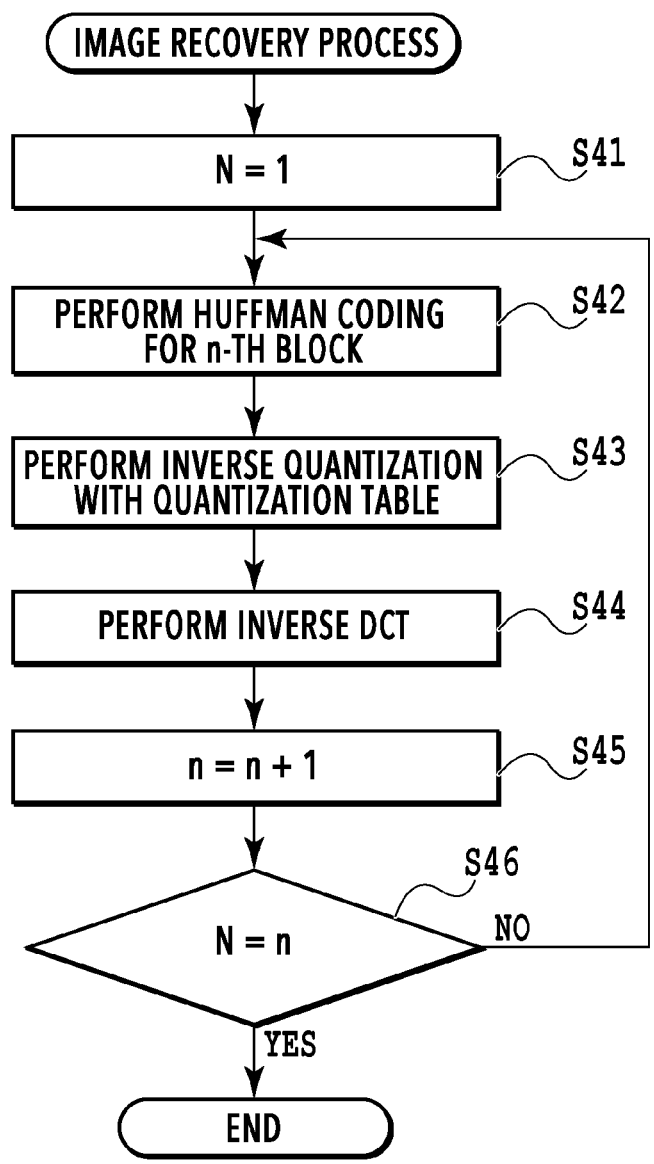
FIG. 4 is a flowchart illustrating an operation of an image data recovery unit illustrated in FIG. 3.

FIG. 4 is a flowchart illustrating a process for decoding the encoded image data. For example, it is assumed that an image compressed in a JPEG data format is divided into N 8-pixel square blocks (blocks of 8×8 pixels). First, Huffman coding is performed for a first block in the unit of 8-pixel square blocks (S41 and S42) and inverse quantization is performed for the first block using the obtained quantization table (S43). Then, inverse DCT is performed for the first block (S44). This process is performed for all of the N blocks of a target screen (S45 and S46). Since a JPEG decoding process uses a known method, Huffman coding, inverse quantization, and inverse DCT will not be described in detail below, but will be described in brief.

Huffman coding is a compression method which allocates a code with a small number of bits to data with a high frequency to reduce the total number of bits. Huffman decoding defines a Huffman code in the specifications in advance and decodes data into the original data. In inverse quantization, development to image data is performed by inverse quantization using the quantization table (a quantization table used to compress image data) obtained by the accessory information obtaining unit 301. Inverse DCT is a process which performs inverse transformation for returning the image data which has been transformed into a direction-current component (DC component) and an alternating-current component (AC component) by DCT to data with the original image density component. JPEG compression is generally performed in a YCbCr (Y: brightness, Cb and Cr: color difference) format. In this case, data processed by inverse DCT is also converted into the YCbCr format. A value in the YCbCr format is converted into an image signal value in an RGB format by the following Expression 1.

$R=Y+1.402\times Cr;$ $G=Y-0.344\times Cb-0.714\times Cr;$ and $B=Y+1.772\times Cb.$ [Expression 1]

(1-2-3) Image Correction Unit

An image correction unit 303 performs an image correction process for the RGB data complexed by the image data recovery unit 302. Examples of the image correction includes brightness adjustment that increases or decreases the brightness of all colors, contrast adjustment, color balance adjustment, and backlight correction and red-eye correction on the assumption that a photograph is printed. The image correction unit 303 performs these correction processes in an integrated manner to achieve a process that does not depend on the printing apparatus.

(1-2-4) Resolution Conversion Unit

A resolution conversion unit 304 converts the image data into a resolution corresponding to the printing apparatus. The resolution conversion unit 304 performs a reduction or enlargement process on the basis of a variable magnification ratio that is calculated according to the input mage data and the resolution of the printing apparatus. For example, a nearest neighbor interpolation method, a bilinear interpolation method, and a bicubic interpolation method are used as a magnification change process. The magnification change process may be appropriately selected considering the characteristics of the process and a processing speed.

(1-2-5) Color Correction Unit

A color correction unit 305 performs a conversion process for the image data such that an image printed by the printing apparatus has appropriate colors. For example, in a case where the image displayed on the display apparatus is printed, the color reproduction ranges of the display apparatus and the printing apparatus are not necessarily matched with each other. For a given color, the reproduction range of the printing apparatus is narrower than that of the display apparatus. For another color, the reproduction range of the printing apparatus is wider than that of the display apparatus. Therefore, it is necessary to minimize the deterioration of image quality and to appropriately compress and decompress colors.

In this example, these processes are performed in an RGB format. That is, an RGB value input to the color correction unit 305 is converted into an RGB value for the printing apparatus (hereinafter, referred to as "printing apparatus RGB") in consideration of the reproducibility of the printing apparatus. This conversion may be performed by, for example, matrix calculation. In general, a three-dimensional color correction table 311 is used. In a case where an input RGB value is 8 bits for each color (256 grayscale levels), it is not practical to store all combinations in terms of storage capacity. For this reason, a table thinned at a predetermined interval is used as the color correction table 311.

Figure 6A:
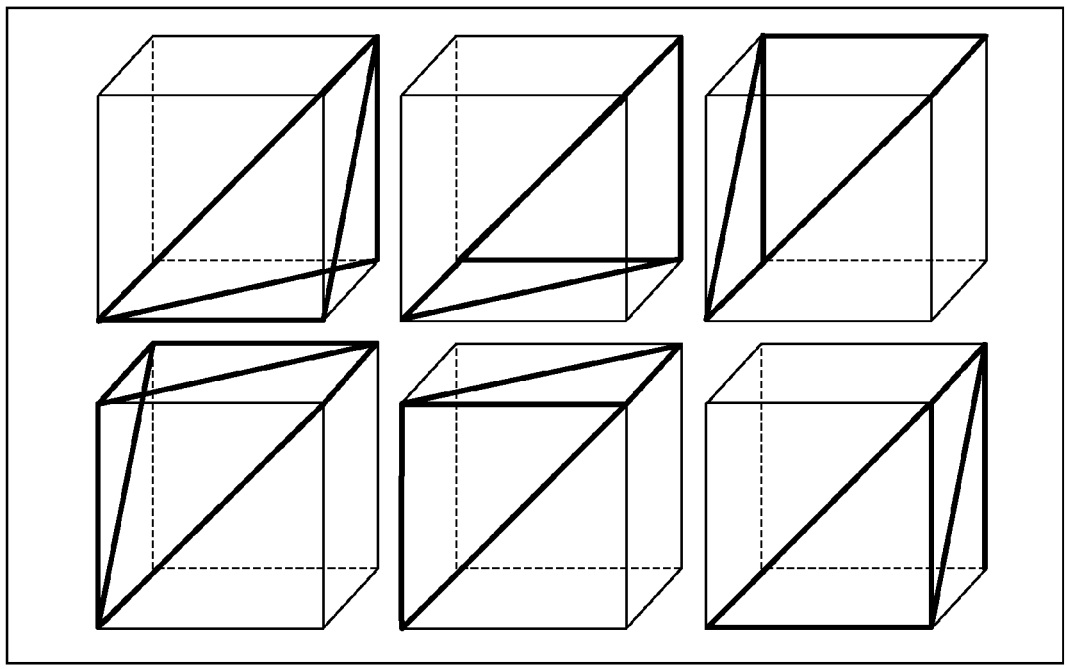
FIGS. 6A and 6B are diagrams illustrating a tetrahedron interpolation method for interpolating a value between grid points in the color correction table illustrated in FIG. 5.
Figure 6B:
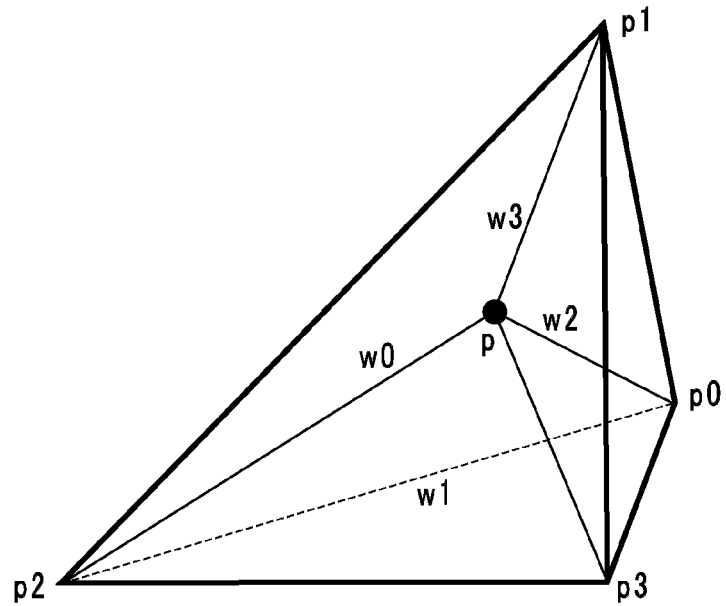

FIG. 5 is a diagram illustrating an example of the color correction table 311. In this example, in the color correction table 311, 256 grayscale levels of each color are represented by 17 grid points and printing apparatus RGB values corresponding to the grid points are described (17*17*17=4913 grid points). A value between the grid points is calculated by an interpolation process. An interpolation method can be selected from some methods and the selected method can be used. In this example, a tetrahedron interpolation method is used. The tetrahedron interpolation method is linear interpolation which has a tetrahedron as a division unit of a three-dimensional space and uses four grid points. In the tetrahedron interpolation method, first, as illustrated in FIG. 6A, a three-dimensional space is divided into tetrahedrons and a tetrahedron to which a target point P belongs is determined from among the divided tetrahedrons. Four vertices of the tetrahedron are p0, p1, p2, and p3 and the tetrahedron is further divided into small tetrahedrons as illustrated in FIG. 6B. In a case in which conversion values for each point are f(p0), f(p1), f(p2), and f(p3), an interpolation value f(p) can be calculated by the following Expression 2.

$$f(p) = \sum_{i=0}^{3} wi \times f(pi) = [w0, w1, w2, w3]\begin{bmatrix} f(p0) \\ f(p1) \\ f(p2) \\ f(p3) \end{bmatrix} \quad \text{[Expression 2]}$$

Here, w0, w1, w2, and w3 are the volume ratio of the small tetrahedrons at positions opposite to each vertex pi. As such, a printing apparatus RGB value corresponding to a target RGB value is calculated. In this case, an output may be equal to or greater than 8 bits in consideration of gradation. In addition, the color correction table depends on the color reproduction range of the printing apparatus. For example, in a case where different print sheets (print media) are used for printing, it is preferable to prepare the tables corresponding to different print sheets.

(1-2-6) Ink Color Conversion Unit

An ink color conversion unit 306 converts the printing apparatus RGB value converted by the color correction unit 305 into an ink color value. A color separation table 312 in which a combination of the printing apparatus RGB values and ink color values are associated with each other in advance is used for this conversion. Similarly to the color correction unit 305, a table of 17 grid points is used in the ink color conversion unit 306.

FIG. 7 is a diagram illustrating an example of the color separation table 312. In this example, four colors, that is, cyan (C), magenta (M), yellow (Y), and black (K) are assumed as ink colors and the values of four colors corresponding to each grid point are described in the color separation table 312. These values are determined such that ink does not overflow on a printing surface of a print sheet (print medium) and blur does not occur in a case where ink droplets are adjacent to each other. Therefore, in a case where different print sheets (print media) are used for printing, it is preferable to prepare the color separation tables 312 corresponding to different print sheets. In addition, similarly to the color correction unit 305, the ink color values corresponding to the printing apparatus RGB values can be interpolated by the tetrahedron interpolation process.

(1-2-7) Density Correction Unit 307

In an ink-jet printing apparatus, as the amount of ink that is given in order to form dots on a print sheet (print medium) increases, the overlap between the dots increases. As a result, the print density of an image is less likely to increase. The density correction unit 307 corrects the density in order to uniformize a density response. The density correction makes it easy to ensure the accuracy of creating the color correction table 311 and the color separation table 312. In a printing apparatus using C (cyan), M (magenta), Y (yellow), and K (black) inks, density correction is performed for the ink colors. In this example, a one-dimensional density correction table 313 is used. A table corresponding to an 8-bit (256 grayscale levels) input for each ink color may be prepared as the density correction table 313. In particular, it is possible to use a table in which an input signal value and a corrected output signal value are associated with each other, without using a thinning process.

(1-2-8) Gradation Conversion Unit 308

A gradation conversion unit 308 converts multi-bit data which has been converted for each ink color and then subjected to density correction into the number of grayscale levels that can be printed by the printing apparatus. In this example, data is converted into two grayscale levels (1 bit), that is, printing "1" and non-printing "0". An error diffusion method that excludes a low-frequency component of an image and can reproduce gradation suitable for visual perception is used as a gradation conversion method. In addition, 8-bit data from 0 to 255 is assumed as an input signal.

Figure 8:
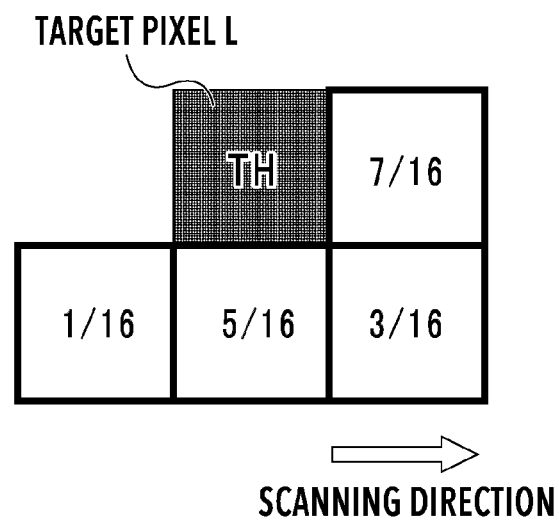
FIG. 8 is a diagram illustrating an error distribution method in an error diffusion method.

FIG. 8 is a diagram illustrating an error distribution method in the error diffusion method. A signal value L of a target pixel is compared with a threshold value TH. In this example, a threshold value is set to 127 in order to binarize 0 to 255 and it is determined whether the target pixel is "1" (printing) or "0" (non-printing) as follows.

L>TH . . . 1 (printing)
L≤TH . . . 0 (non-printing)

A quantization representative value V is determined on the basis of the determination result as follows.

1 (printing) . . . 255
0 (non-printing) . . . 0

In a case where the quantization representative value V is set in this way, an error E (=L−V) that occurs is distributed to neighboring pixels on the basis of distribution coefficients illustrated in FIG. 8.

A value La obtained by adding the distributed error Ea to the signal value L of the next target pixel is compared with a threshold value TH and it is determined whether the target pixel is "1" (printing) or "0" (non-printing) as follows.

La>TH . . . 1 (printing)
La≤TH . . . 0 (non-printing)

The above-mentioned process is performed for all of the pixels and all of the ink colors C, M, Y, and K. In this way, printable 1-bit print data for each ink color is obtained.

(1-2-9) Additional Information

Additional information 309 is the additional information B that is embedded in the image data A in the additional information multiplexing apparatus 102 illustrated in FIG. 1A or the additional information multiplexing unit 105 illustrated in FIGS. 1B and 1s, for example, text document data. The text document data is, for example, numerical data obtained by allocating numbers and characters to values using known character codes. The numerical data is transmitted as the additional information 309 to an additional information multiplexing unit 310.

Specifically, text document data corresponding to characters "hello" will be described. It is assumed that the text document data is numerical data, for example, so-called binary data. The binary data is information "0" or "1" and a sequence of the information items "0" or "1" has a specific meaning. The correspondence between binary data and a character is defined by a "character code". In the case of "shift JIS" which is one of the character codes, "h" corresponds to binary data "01101000". Similarly, "e" corresponds to binary data "01100101", "1" corresponds to binary data "01101100", and "o" corresponds to binary data "01101111". Therefore, the characters "hello" can be represented by binary data "0110100001100101011011000110110001101111". Conversely, in a case in which the binary data "0110100001100101011011000110110001101111" can be obtained, the characters "hello" can be obtained. The additional information 309 corresponds to numerical data converted into the binary data.

(1-2-10) Additional Information Multiplexing Unit

The additional information multiplexing unit 310 receives the image data converted by the resolution conversion unit 304 and the additional information 309 and embeds the additional information 309 in the image data. In this embedment process (multiplexing process), the additional information 309 is embedded in the image data such that the additional information 309 can be read from a print image of the image data in which the additional information 309 (for example, a text document converted into binary data "0" and "1") has been embedded. For example, a masking process is performed for the image data to embed the information items "0" and "1" corresponding to the binary data such that the binary data "0" and "1" of the additional information 309 can be read. In this example, the masking process is performed for the image data to give different periodicities corresponding to the binary data "0" and "1" to image data in a predetermined area.

Figure 9A:
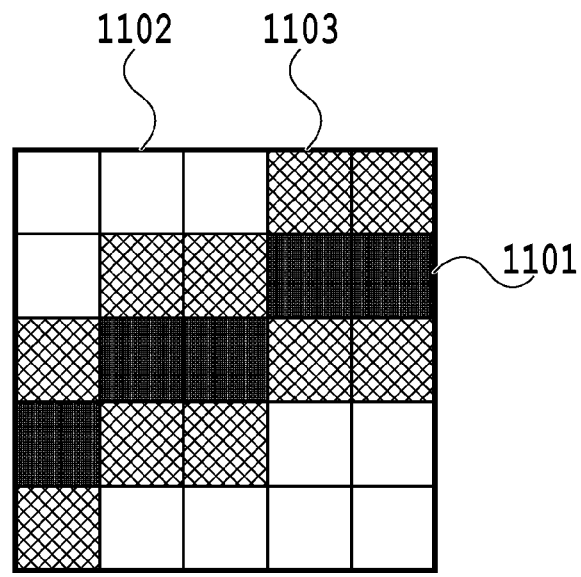
FIGS. 9A and 9B are diagrams illustrating mask data used to process image data.
Figure 9B:
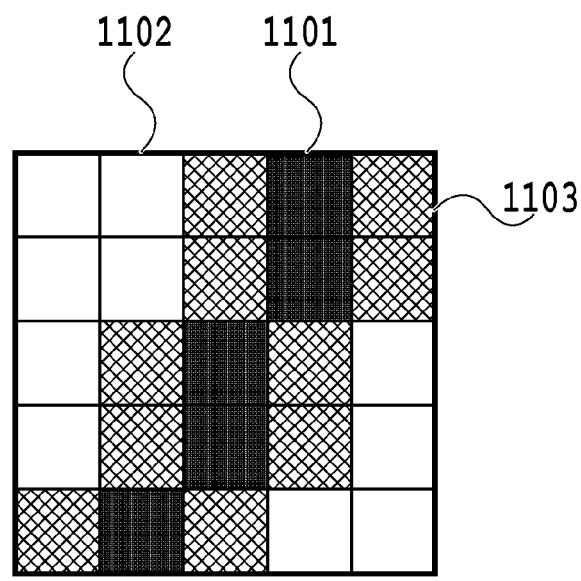

FIGS. 9A and 9B are diagrams illustrating mask data corresponding to the binary data "0" and "1". The mask data has a size corresponding to an area with a size of 5 px (pixels)×5 px (pixels). By the mask data, the patterns with different periodicities illustrated in FIG. 9A or FIG. 9B are combined with the image to embed the binary data "0" and "1" in the image data corresponding to an area of 5 px (pixels)×5 px (pixels). In a case where a print image is read, the periodicity corresponding to the binary data "0" and "1" is recognized by, for example, read data frequency analysis to read the binary data "0" and "1".

The additional information multiplexing unit 310 gives the periodicity corresponding to the binary data "0" and "1" to the image data on the basis of the binary data (numerical data) of the additional information 309 to embed the additional information 309. As an example of a method for embedding the additional information 309 in the image data, a method will be described which regards the image data as gray image data of one color and embeds the binary data "0" and "1" in the entire image data.

It is assumed that the size of a multiplexed image is a vertical width of 640 px and a horizontal width of 480 px and the mask data has a size of 5 px×5 px as illustrated in FIGS. 9A and 9B. It is assumed that the binary data "0" is represented by the mask data illustrated in FIG. 9A and the binary data "1" is represented by the mask data illustrated in FIG. 9B. In the mask data illustrated in FIGS. 9A and 9B, 5×5 pixel block is classified into a black block 1101, a white block 1102, and a hatched block 1103. The black block 1101 corresponds to a value "+2", the white block 1102 corresponds to a value "0", and the hatched block 1103 corresponds to a value "−1". In a case in which "maskA" is "true", the mask data illustrated in FIG. 9A corresponding to "0" is used. In a case in which "maskA" is "false", the mask data illustrated in FIG. 9B corresponding to "1" is used. Pseudo codes for applying the values corresponding to the black, white, and hatched blocks illustrated in FIGS. 9A and 9B to the entire image data are as follows:

Pseudo Codes:

```
1    int i, j, k, l;
2    int width = 640, height = 480;
3    unsigned char*data = image data;
4    int**maskA = mask data;
5    bool isMaskA = true;
6    for (j = 0; j < height; j+=5){
7      for (i = 0; i < width; i+=5) {
8        for (k = 0; k < 5; k++) {
9          for (l = 0; l < 5; l++) {
             if (isMaskA = = true) {
10           data[(i+k)+(j+l)*width] += maskA[k][l];
             }
11         }
12       }
13     }
14   }
```

As represented by the pseudo codes, the entire image is divided into blocks of 5 px×5 px and the data of "maskA" is added to each block to form the patterns illustrated in FIGS. 9A and 9B.

In some cases, a pattern that is less likely to be visually recognized by the eyes is desired to be formed as the pattern corresponding to the binary data (numerical data) of the additional information 309. In a case where the image data is gray image data of one color as in this example, the pattern needs to be formed by a brightness component. Therefore, the pattern is likely to be visually recognized by the eyes. A change in color component tends to be less likely to be visually recognized than a change in brightness component, which depends on the shape of the pattern and a frequency component. For example, a color image having RGB components is converted into a color space, such as YCbCr, Lab, or Yuv, and is divided into a brightness component and a color component. Then, the mask data is not applied to the brightness component, but is applied to the color component to form the pattern that is not likely to be visually recognized. In addition, for example, in a case where a red color is dominant in an area of 5 px×5 px to which the pattern is given in a color image having RGB components, it is preferable that the pattern is given by the red component.

In this example, the mask data is divided into blocks of 5 px×5 px and is then added to the image data. However, the unit of the block size and the shape of the mask are not particularly limited. A method for embedding the mask data in the image data may be combinations of, for example, addition, subtraction, multiplication, and division. In a case where an image of a printed matter having the additional information 309 embedded therein is captured, any method may be used as long as it can distinguish the pattern of the mask data. Therefore, the additional information multiplexing unit 310 is a processing unit for embedding the additional information 309 in the image data such that the additional information 309 can be extracted in a case where the image of a printed matter having the additional information 309 embedded therein is captured.

(1-3) Multiplexing Encoding Process

Figure 10:
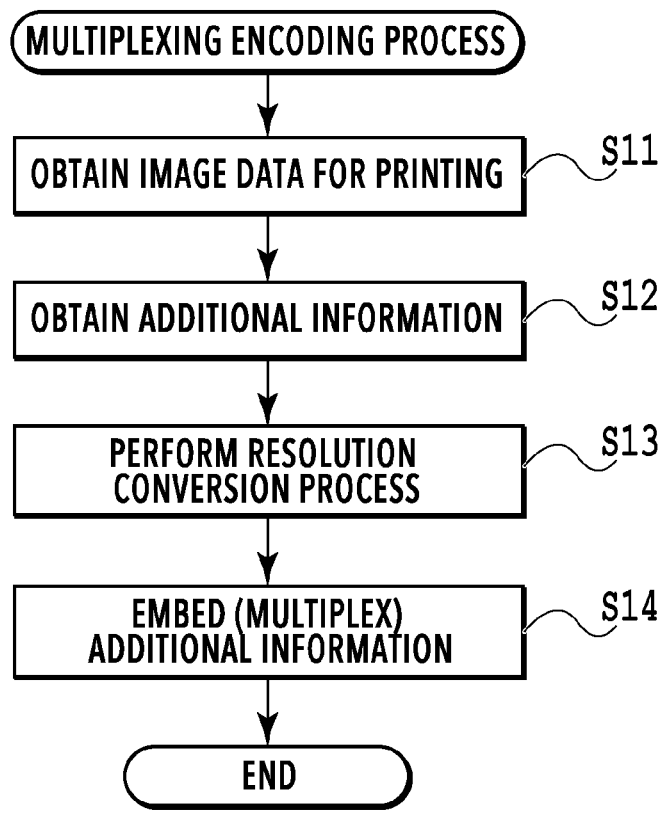
FIG. 10 is a flowchart illustrating a multiplexing encoding process.

FIG. 10 is a flowchart illustrating a multiplexing encoding process in this example.

First, the accessory information obtaining unit 301 and the image data recovery unit 302 illustrated in FIG. 3 obtain the image data A for printing (Step S11). For example, the image data A is data whose image has been captured by a camera-equipped mobile terminal (smart phone) in advance and then stored in a JPEG format in a memory of the mobile terminal. The obtained JPEG image data is decompressed to generate a still image of 8-bit RGB image data of three colors. In addition, the image correction unit 303 illustrated in FIG. 3 performs correction and processing for the obtained image data if necessary.

Then, the additional information 309 to be embedded in the image data A is obtained (Step S12). For example, text document data which has been input through keys of the smart phone is obtained. It is assumed that the text document data is, for example, numerical data obtained by allocating numbers and characters to values using known character code shift JIS. The numerical data is transmitted as the additional information 309 to the additional information multiplexing unit 310.

Then, the resolution conversion process is performed for the obtained image data A on the basis of a selected paper size (the size of a print medium) and the resolution of the printing apparatus (Step S13). For example, in a case where the selected paper size is 2L, the resolution of the image data A is converted according to the number of pixels of the input resolution in the printing apparatus. Specifically, in a case where the input resolution in the printing apparatus is 600 dots per inch (dpi), the number of pixels of a paper size of 2L is set to 3000 pixels×4000 pixels. In this case, resolution conversion is performed for the image data A in which the number of pixels is 1500 pixels×2000 pixels such that the numbers of pixels in the vertical direction and the horizontal direction are doubled. In a case where the aspect ratio of an input image is not desired to be changed, resolution conversion is performed such that reduction and enlargement ratios in the vertical direction and the horizontal direction are equal to each other.

Figure 11:
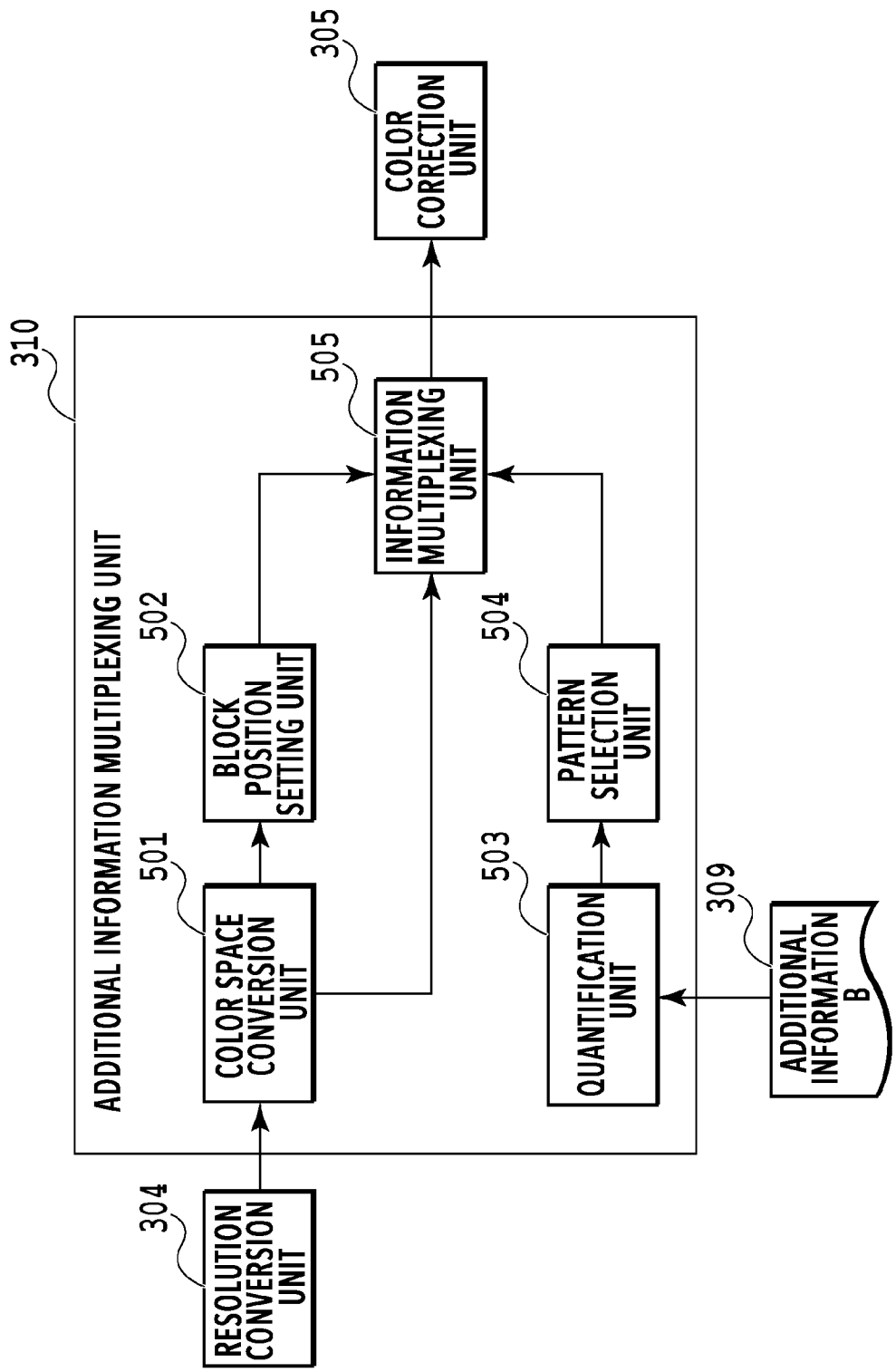
FIG. 11 is a block diagram illustrating an additional information multiplexing unit illustrated in FIG. 3.

Then, the additional information multiplexing unit 310 illustrated in FIG. 3 performs the additional information multiplexing process for embedding the additional information 309 in the image data A (Step S14). FIG. 11 is a block diagram illustrating the firmware configuration of the additional information multiplexing unit 310 in this example. Next, each processing unit of the additional information multiplexing unit 310 will be described.

(1-3-1) Color Space Conversion Unit

A color space conversion unit 501 is a processing unit that converts a color space of the image data whose size has been changed by the resolution conversion unit 304 into a color space for information multiplexing. For example, the color space for information multiplexing is U of YUV and an RGB color space of the image data is converted into a YUV color space by the following Expression 3.

$$Y = 0.299 \times R + 0.587 \times G + 0.114 \times B$$

$$U = -0.169 \times R - 0.331 \times G + 0.500 \times B$$

$$V = 0.500 \times R - 0.419 \times G - 0.081 \times B \qquad \text{[Expression 3]}$$

(1-3-2) Block Position Setting Unit

In this example, the image data is divided into a plurality of block areas and the density of pixels in each block is modulated to form the patterns corresponding to the mask data illustrated in FIGS. 9A and 9B, thereby embedding the additional information 309. A block position setting unit 502 obtains the image data subjected to the color space conversion and sets the positional coordinates of the blocks in a plane image of a designated color according to the size of a designated block. For example, it is assumed that the size of a plane image of U of YUV is a vertical width of 640 px and a horizontal width of 480 px and the block size is a vertical width of 5 px and a horizontal width of 5 px. In this case, the number of vertical blocks is 128 (=640÷5), the number of horizontal blocks is 96 (=480÷5), and the total number of blocks is 12288 (=128×96). For example, the coordinates of the upper left corner of each block can be set as the position of the block.

(1-3-3) Quantification Unit

A quantification unit 503 converts the received additional information 309 into quantified data. For example, it is assumed that the additional information 309 is a shift JIS character string. In this case, a conversion map in which characters and numbers are associated with each other in a shift JIS format is stored in advance and a character string is converted into a sequence of numbers using the conversion map. For example, in the case of a character string "hello", the character string is converted into a sequence of numbers "0110100001100101011011000110110001101111".

(1-3-4) Pattern Selection Unit

The mask patterns for modulating the density of each pixel in each block are registered in a pattern selection unit

504. The pattern selection unit 504 selects a mask pattern to be applied to the additional information 309 quantified by the quantification unit 503.

FIGS. 12A and 12B are diagrams illustrating patterns obtained by quantifying the patterns with different frequency characteristics illustrated in FIG. 9A and FIG. 9B. As described above, the patterns illustrated in FIGS. 9A and 12A correspond to the binary data "0" in the additional information 309 and the patterns illustrated in FIGS. 9B and 12B correspond to the binary data "1" in the additional information 309.

(1-3-5) Information Multiplexing Unit

An information multiplexing unit 505 obtains the image data subjected to the color space conversion by the color space conversion unit 501, the position of each block set by the block position setting unit 502, and the mask pattern selected by the pattern selection unit 504. The information multiplexing unit 505 applies the mask pattern to the image data to generate image data from the obtained information.

As described above, in a case where an image size is a vertical width of 640 px and a horizontal width of 480 px and the size of one block is a vertical width of 5 px and a horizontal width of 5 px, the total number of blocks is 12288. In a case where a print image of the printed matter C is captured, the entire image is not necessarily captured. Therefore, the same additional information is embedded at a plurality of positions of the print image such that the additional information can be extracted only by capturing a portion of the print image of the printed matter C. For example, in a case where 96 blocks form one additional information item, the same additional information is embedded in 128 (=12288÷96) areas with respect to a total of 12288 blocks. Therefore, the image data is divided into 128 areas and the additional information formed by 96 blocks, each of which has a vertical width of 5 px and a horizontal width of 5 px, is embedded in one of the 128 areas. Since 96 blocks are treated as one additional information items, 96-bit additional information can be set. However, 8-bit additional information "11111111" which is not represented as a character in shift JIS is included in the head such that a start position of 96 bits is known. Therefore, 88-bit (=96−8) data is the additional information.

Data included in 96 bits is a sequence of numbers "0" and "1" in the additional information quantified by the quantification unit 503. A value is defined for each block of 5 px×5 px and a mask pattern corresponding to the value is selected. A mask pattern corresponding to the additional information is embedded in a block of 5 px×5 px in the image data. For example, it is assumed that image data is a U plane of YUV, each block (5 px×5 px) of the image data is processed, and the values of the mask patterns illustrated in FIGS. 12A and 12B are applied to the value of the U plane of YUV. For example, the value (U value) of the U plane of YUV is added or subtracted according to the values of the mask patterns and it is assumed that a reference value for the addition or subtraction process is 10, as illustrated in the following Expression 4.

($U$ value after application)=($U$ value of YUV)+(reference value)×(values of mask patterns). [Expression 4]

For example, in a case where the U value of one pixel in one block is "20" and the value of the mask pattern to be applied is "0", the U value is processed as illustrated in the following Expression 5.

($U$ value after application)=20+10×0=20. [Expression 5]

In a case where the U value of one pixel in one block is "30" and the value of the mask pattern to be applied is "2", the U value is processed as illustrated in the following Expression 6.

($U$ value after application)=30+10×2=50. [Expression 6]

As such, in this example, the product of the value of the mask pattern applied to each pixel and the reference value is added to achieve multiplexing. A method for applying the mask pattern is not limited to the method according to this example as long as it can embed the mask pattern in the U plane. For example, the U value of YUV may be multiplied by the value of the mask pattern.

Such a multiplexing encoding process is performed by the additional information multiplexing apparatus 102 illustrated in FIG. 1A or the additional information multiplexing unit 105 illustrated in FIG. 1B. The multiplexing encoding process may not be included in the printer 103 or may be included in the printer 103. The image data subjected to the multiplexing encoding process which has been generated in the additional information multiplexing apparatus 102 or the additional information multiplexing unit 105 is transmitted to the printer 103 or the printing unit 106.

(1-4) Image Data Printing Process

Figure 13:
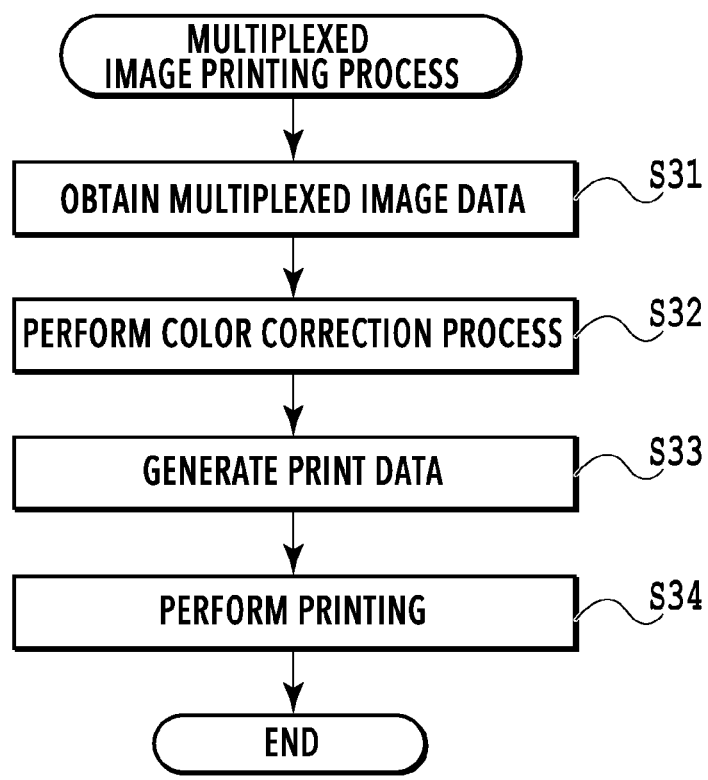
FIG. 13 is a flowchart illustrating an image data printing process.

FIG. 13 is a flowchart illustrating an image data printing process after the multiplexing encoding process.

First, the additional information multiplexing unit 310 illustrated in FIG. 3 obtains the image data having the additional information embedded therein (multiplexed image data) (Step S31). Then, the color correction unit 305 illustrated in FIG. 3 performs appropriate color correction for the multiplexed image data (Step S32). Then, the ink color conversion unit 306, the density correction unit 307, and the gradation conversion unit 308 illustrated in FIG. 3 convert the color-corrected image data into an ink color value, correct the density of the image data, and convert the density-corrected image data into a gradation value to generate print data (Step S33). The print data is transmitted to the print engine illustrated in FIG. 3 and the print engine gives each color ink to a print medium on the basis of the print data to generate the printed matter C.

(1-5) Basic Firmware of Multiplexing Decoding Process

Figure 14A:
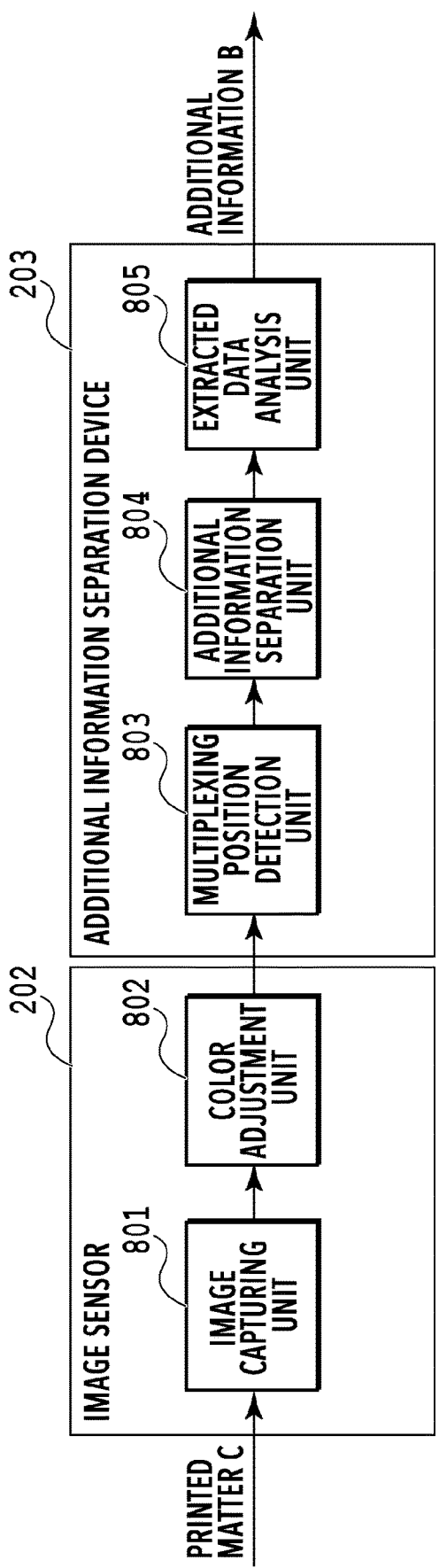
FIG. 14A is a block diagram illustrating the multiplexing decoding processing unit illustrated in FIG. 2.

FIG. 14A is a diagram illustrating the basic firmware configuration of the multiplexing decoding process according to this example and the multiplexing decoding process extracts the additional information embedded in the print image of the printed matter C.

The image sensor 202 (see FIG. 2) according to this example includes an image capturing unit 801 and a color adjustment unit 802. The additional information separation device 203 (see FIG. 2) according to this example includes a multiplexing position detection unit 803, an additional information separation unit 804, and an extracted data analysis unit 805. In this example, quantified additional information data, such as text document data, audio data, or moving image data, is embedded in the print image of the printed matter C. In the following description, it is assumed that the same additional information is repeatedly embedded at each predetermined area in the entire print image of the printed matter C.

(1-5-1) Image Capturing Unit

The image capturing unit 801 captures the print image of the printed matter C using an imaging element of the image sensor 202 and converts the image into image data.

Figure 14B:
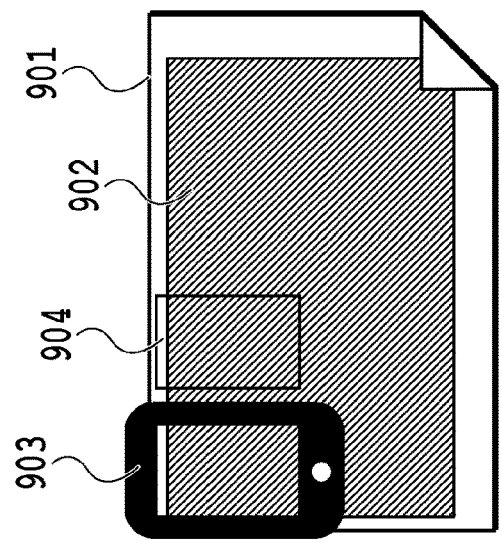
FIG. 14B is a diagram illustrating a case in which a print image is captured by a camera-equipped mobile terminal.

FIG. 14B is a diagram illustrating a case in which the camera-equipped mobile terminal 201 captures the print image of the printed matter C. The image subjected to the multiplexing encoding process is printed in a print area 902 of a print medium 901 corresponding to the printed matter C. An area 904 is an area whose image is captured by an apparatus 903 corresponding to the camera-equipped mobile terminal 201 illustrated in FIG. 2. The image capturing unit 801 captures the image of the area 904 in the print area 902 of the print medium 901 using the apparatus 903. A CCD can be used as the imaging element of the image capturing unit 801. The CCD senses light using a photodiode (light receiving element) and converts the light into a voltage. At that time, light can be converted into color data by, for example, an RGB or CMY color filter that is provided for each imaging element. A signal detected by the photodiode is transmitted to the color adjustment unit 802.

(1-5-2) Color Adjustment Unit

In the color adjustment unit 802, the output data of the photodiode in the image capturing unit 801 is converted into image data with RGB 8-bit per one pixel. Before the output data is converted into the image data, for example, an RGB color interpolation process is performed for the output data of the photodiode according to a light source during capturing. In a case where capturing is performed by, for example, a digital camera and the camera-equipped mobile terminal 201, the interpolation process performs adjustment such that a captured image of a white object looks white. Since the image capturing unit 801 detects light which has been emitted from a light source, such as the sun or a light, and then reflected from the object using the photodiode, the color of the image varies depending on the light source. Therefore, the color adjustment unit 802 performs the interpolation process corresponding to the light source.

As a general interpolation method, there is a method using Kelvin (K) which is the unit of quantification of the color of light represented by a color temperature indicating the color of a light source. In general, sunlight in the daytime is 5500 K and an incandescent lamp is 3000 K. In a case the color temperature is high, light looks blue. In a case the color temperature is low, light looks red. Therefore, the color of a captured image varies depending on the light source. In general, a digital camera, the camera-equipped mobile terminal 201, and the like have a so-called auto white balance adjustment function which detects a color temperature using a sensor during capturing and automatically adjusts a white balance such that a captured image of a white object looks white. In addition, it is possible to manually adjust the white balance according to the light source such as sunlight or an incandescent lamp.

The color adjustment unit 802 adjusts the white balance of the output data of the photodiode to generate image data. The image data is transmitted to the additional information separation device 203.

(1-5-3) Multiplexing Position Detection Unit

The multiplexing position detection unit 803 receives the image data whose color has been adjusted by the color adjustment unit 802 and determines the frequency characteristics of the image data to detect the position (multiplexing position) where the additional information is embedded.

Figure 15A:
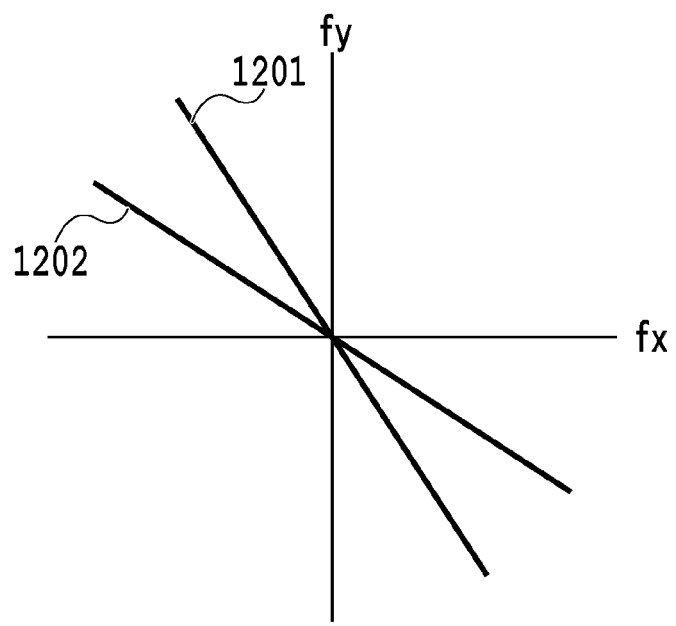
FIG. 15A is a diagram illustrating a method for determining the frequency characteristics of image data in a multiplexing position detection unit illustrated in FIG. 14A.

FIG. 15A is a diagram illustrating a difference in frequency characteristics in a two-dimensional frequency domain. In FIG. 15A, the horizontal axis indicates a frequency in the horizontal direction, the vertical axis indicates a frequency in the vertical direction, and the origin as the center indicates a direct-current component. As the distance from the origin increases, the frequency increases. In this example, the frequency characteristics are changed by the multiplexing process.

For example, as described above, a large power spectrum is generated on a straight line 1201 illustrated in FIG. 15A by a change in the frequency characteristics in a case where the mask pattern illustrated in FIG. 9A is applied. In addition, a large power spectrum is generated on a straight line 1202 illustrated in FIG. 15A by a change in the frequency characteristics in a case where the mask pattern illustrated in FIG. 9B is applied. In a case where the additional information is separated, a frequency vector in which the large power spectrum is generated is detected in order to determine a multiplexed signal. Therefore, it is necessary to individually enhance each frequency vector and to extract the frequency vector.

Therefore, it is possible to use high-pass filters (HPF) having the same frequency characteristics as the mask patterns illustrated in FIGS. 12A and 12B. A space filter corresponding to the mask pattern illustrated in FIG. 12A can enhance the frequency vector on the straight line 1201 illustrated in FIG. 15A. A space filter corresponding to the mask pattern illustrated in FIG. 12B can enhance the frequency vector on the straight line 1202 illustrated in FIG. 15A. For example, it is assumed that a large power spectrum is generated on the frequency vector on the straight line 1201 illustrated in FIG. 15A by the quantization condition in which the mask pattern illustrated in FIG. 12B is applied. In this case, the amount of change in the power spectrum is amplified by the space filter corresponding to the mask pattern illustrated in FIG. 12A, but is hardly amplified by the space filter corresponding to the mask pattern illustrated in FIG. 12B. That is, in a case where filtering is performed by a plurality of space filters arranged in parallel, the power spectrum is amplified only by the space filters in which the frequency vectors are matched with each other and is hardly amplified by the other filters. Therefore, the frequency vector on which a large power spectrum is generated can be determined by specifying the space filter amplifying the power spectrum. As such, the determination of the frequency characteristics makes it possible to extract the additional information. At that time, in a case where the extraction position of the additional information deviates, it is difficult to accurately extract the additional information.

Figure 15B:
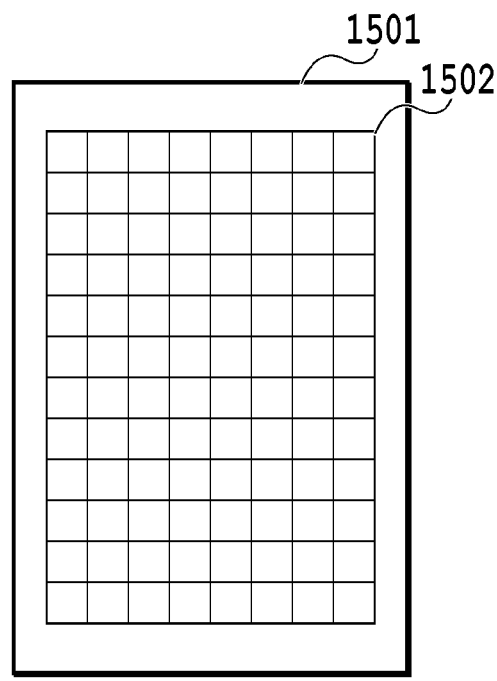
FIG. 15B is a diagram illustrating a print area of a printed matter.

FIG. 15B is a diagram illustrating the print area of the printed matter C. A print medium 1501 as the printed matter C includes an area 1502 in which multiplexing is performed in each of a plurality of blocks and the additional information is embedded in the area 1502 divided into the blocks such that the area has specific frequency characteristics.

Figure 16A:
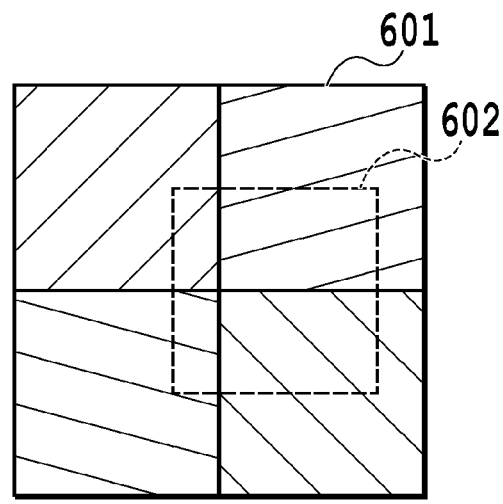
FIGS. 16A and 16B are diagrams illustrating a relationship between the frequency characteristics of the image data and a determination area.
Figure 16B:
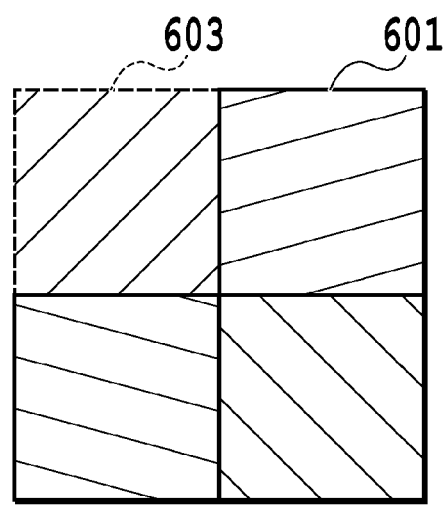

FIGS. 16A and 16B are diagrams illustrating the relationship between the multiplexed block and a frequency characteristic determination area. The print medium 1501 is multiplexed in four blocks. In FIG. 16A, a determination area 602 for determining the frequency characteristics of each block deviates from the position of the block. In FIG. 16B, a determination area 603 for determining the frequency characteristics of each block is aligned with the position of the block. In FIG. 16A, it is possible to accurately determine the frequency characteristics in the determination area 602. In contrast, in FIG. 16B, in the determination area 603, the power spectrum of a specific frequency vector is reduced and it is difficult to accurately determine the frequency characteristics.

The multiplexing position detection unit 803 determines the frequency characteristics of each block in which the additional information has been multiplexed, using the space filter. At that time, it is necessary to specify the position of the block in which the additional information has been multiplexed. The position of the block in which the additional information has been multiplexed can be specified on the basis of the intensity of the power spectrum of a specific frequency vector. Therefore, the multiplexing position detection unit 803 detects frequency characteristics in a captured image while shifting the frequency characteristic determination area for each block and determines the frequency characteristics to specify the position of the block in which the additional information has been multiplexed.

(1-5-4) Additional Information Separation Unit

The frequency characteristics of each block is determined on the basis of the position of the block detected by the multiplexing position detection unit 803 and the additional information separation unit 804 extracts the multiplexed additional information on the basis of the determination result of the frequency characteristics of each block.

As illustrated in FIG. 15B, in a case where the total number of blocks in which the additional information has been multiplexed is 96 blocks (8 blocks in the horizontal direction×12 blocks in the vertical direction), the additional information items "0" and "1" are embedded in each block by the multiplexing encoding process. The additional information to be embedded in each block is determined on the basis of the frequency vector of each block. That is, the additional information to be embedded in a block in which the frequency vector of the straight line 1201 illustrated in FIG. 15A is greater than a predetermined threshold value is determined to be "0". In addition, the additional information to be embedded in a block in which the frequency vector of the straight line 1202 illustrated in FIG. 15A is greater than the predetermined threshold value is determined to be "1".

The frequency characteristic determination area is shifted in the unit of blocks on the basis of the position of the block detected by the multiplexing position detection unit 803 to determine the frequency characteristics of a total of 96 blocks in FIG. 15B. Therefore, it is possible to extract the additional information embedded in each block. In this case, since 1-bit additional information "0" or "1" can be extracted from each block, it is possible to extract a total of 96 bits of data from a total of 96 blocks. As such, it is possible to extract the multiplexed additional information from a plurality of blocks by determining the frequency characteristics while shifting the frequency characteristics determination area.

(1-5-5) Extracted Data Analysis Unit

The extracted data analysis unit 805 analyzes the sequence of numbers which has been separated as the additional information by the additional information separation unit 804 and converts the sequence of numbers into the original format of the additional information before embedment.

For example, a character code of text document data which is the additional information to be multiplexed is quantified into a "shift JIS" code in advance. For a 1-byte shift JIS code (half-width character), conversion (quantification) corresponding to a number or a character can be performed by a combination of upper 4 bits and lower 4 bits. For example, in a case where the upper 4 bits are "0100" and the lower 4 bits are "0001", the sequence of numbers is determined to be "A". As such, a conversion map is stored in advance and the conversion map and the sequence of numbers are associated with each other to convert the sequence of numbers into a character. For example, the sequence of numbers separated as the additional information is temporarily stored in the RAM 206 illustrated in FIG. 2 and a "shift JIS" conversion map can be stored in the secondary storage device 207 in advance such that it can be referred.

It is assumed that the sequence of numbers extracted as the additional information by the additional information separation unit 804 is "0110100001100101011011000110110001101111". In this case, the sequence of numbers is converted by the conversion map as follows.

A combination of upper 4 bits "0110" and lower 4 bits "1000" is converted into a character "h".

A combination of upper 4 bits "0110" and lower 4 bits "0101" is converted into a character "e".

A combination of upper 4 bits "0110" and lower 4 bits "1100" is converted into a character "l".

A combination of upper 4 bits "0110" and lower 4 bits "1100" is converted into a character "l".

A combination of upper 4 bits "0110" and lower 4 bits "1111" is converted into a character "o".

Therefore, the sequence of numbers is converted into a character string "hello".

For example, the character string extracted as the additional information can be displayed on the display 208 illustrated in FIG. 2. In addition, in a case where the extracted character string is a uniform resource locator (URL), the information processing apparatus may be connected to a network by the wireless LAN 210 illustrated in FIG. 2 and display a screen of a URL destination on the display 28 using a browser. In a case where the URL is a moving image site, a moving image may be displayed on the display 208 and a sound may be output from the speaker 211.

(1-6) Multiplexing Decoding Process

Figure 17:
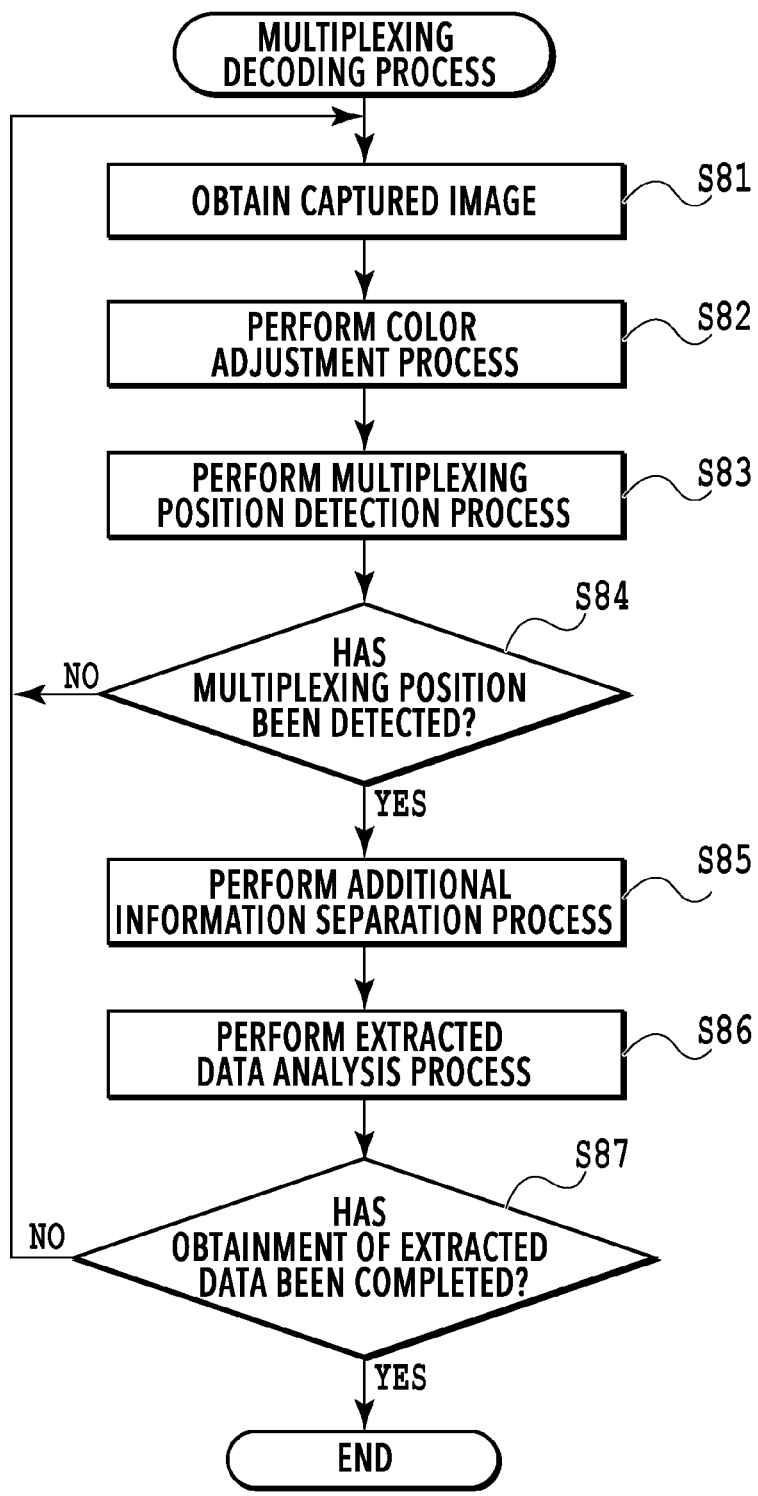
FIG. 17 is a flowchart illustrating a multiplexing decoding process.

FIG. 17 is a flowchart illustrating the multiplexing decoding process according to this example.

First, the image sensor of the image capturing unit 801 illustrated in FIG. 14A in the camera-equipped mobile terminal 201 (see FIG. 2) captures the print image of the printed matter C (Step S81). The captured light is converted into color data and is then transmitted to the color adjustment unit 802 illustrated in FIG. 14A. The color adjustment unit 802 adjusts the white balance of the output data from the photodiode to generate image data (Step S82). The generated image data is transmitted to the additional information separation device 203 illustrated in FIGS. 2 and 8 or is stored in the secondary storage device 207 illustrated in FIG. 2. The multiplexing position detection unit 803 illustrated in FIG. 14A detects the multiplexing position on the basis of the image data whose white balance has been adjusted (Step S83), as described above. In Step S84, it is determines whether the position of the block in which the additional information has been multiplexed has been detected by the multiplexing position detection unit 803. In a case where the position has been detected, the process proceeds to a next process for separating the additional information (Step S85). In a case where the position has not been detected, the process returns to Step S81.

In Step S85, the additional information separation unit 804 illustrated in FIG. 14A determines the frequency characteristics of each block on the basis of the image data generated by the color adjustment unit 802 and the position of the block detected by the multiplexing position detection unit 803. Then, the additional information separation unit 804 extracts the multiplexed additional information as the numerical data on the basis of the determination result. The extracted numerical data is transmitted to the extracted data analysis unit 805 illustrated in FIG. 14A. Alternatively, the extracted numerical data is temporarily stored in the RAM 206 illustrated in FIG. 2 and is then notified to the extracted data analysis unit 805 illustrated in FIG. 14A.

Then, the extracted data analysis unit 805 illustrated in FIG. 14A analyzes the numerical data extracted as the additional information and converts the numerical data into the additional information such as characters (Step S86), as described above. In Step S87, it is determined whether or not the conversion of all of the extracted numerical data into the additional information by the extracted data analysis unit 805 has been completed. In a case where the conversion has been completed, the multiplexing decoding process illustrated in FIG. 17 ends. In a case where the conversion has not been completed, the process returns to Step S81. The additional information from which, for example, a character has been extracted can be displayed on the display 208 illustrated in FIG. 2. In addition, it is possible to access the network on the basis of the additional information.

In a case where the additional information has not been completely extracted from the printed matter C, it is considered that this is because only a portion of the area in which the additional information has been embedded is included in the captured area of the printed matter C. In this case, since only a portion of the additional information can be extracted, it is necessary to capture the image of the printed matter C again. For example, in order to determine whether the additional information can be extracted, a value indicating the amount of data of the additional information may be included in the additional information in advance and the amount of data of the additional information may be determined from the value. In order to determine whether data as the additional information relates to the amount of data or character data, for example, combinations of the sequences of numbers are determined in advance and several bits before and after the sequence of numbers is used as data related to the amount of data.

In addition, in a case where only a portion of the additional information can be extracted, for example, only the extracted content may be stored in the secondary storage device 207 illustrated in FIG. 2 and the extracted additional information may be combined with a portion of the stored additional information by the subsequent process. As such, the additional information may be extracted a plurality of numbers of times. In addition, the additional information extracted a plurality of numbers of times may be sequentially displayed on, for example, the display 208 illustrated in FIG. 2.

(2) Characteristic Configuration

In this embodiment, a characteristic configuration is added to the above-mentioned basic configuration of the multiplexing decoding processing unit.

Figure 18:
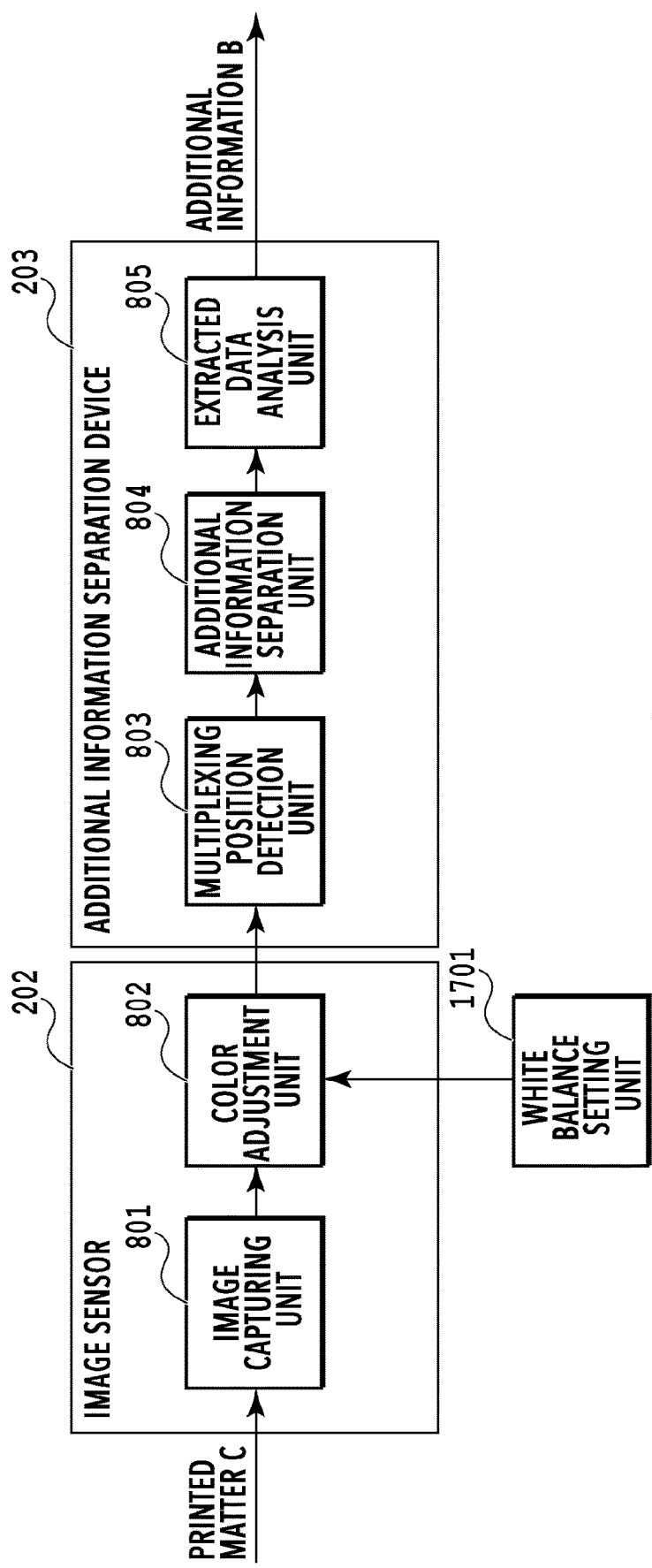
FIG. 18 is a diagram illustrating the characteristic configuration of the multiplexing decoding processing unit in the first embodiment of the present invention.

FIG. 18 is a diagram illustrating the multiplexing decoding processing unit characterized by this embodiment. In this configuration, the multiplexing decoding processing unit with the basic configuration illustrated in FIG. 14A further includes a white balance setting unit 1701. Specifically, the white balance setting unit 1701 is connected to the color adjustment unit 802 of the image sensor 202. Next, the process of the white balance setting unit 1701 and the color adjustment unit 802 will be described.

In order to capture an image of the printed matter C on which the image subjected to the multiplexing encoding process has been printed, a multiplexing decoding processing application installed in the camera-equipped mobile terminal 201 (see FIG. 2) is run to operate the image sensor 202. In a case where an application is run in a general camera, the white balance is automatically adjusted by the auto white balance adjustment function. In this embodiment, the multiplexing decoding processing application adjusts the white balance, without depending on the auto white balance adjustment function. Hereinafter, white balance adjustment will be described and other processes will not be described since they have the same basic configuration as described above.

(2-1) White Balance Setting Unit

The white balance setting unit 1701 is a processing unit that is provided in the camera-equipped mobile terminal 201 and sets a white balance adjustment value in a case where an image of the printed matter C is captured. In a case where the printed matter C in which an image, in which a specific color is dominant, has been printed is captured and an "auto" (auto white balance adjustment) mode for automatically adjusting the white balance is set, there is a concern that the erroneous determination that "color fogging" has occurred will be made. In this case, the color of the captured image is changed. For example, a case in which a color component of a YUV-U component is modulated by mask data and the like, and the image of the printed matter C subjected to the multiplexing encoding process is captured is assumed. The RGB values of two pixels A1 and A2 in the captured image are as follows.

Pixel A1 (R, G, B)=(100, 39, 254)
Pixel A2 (R, G, B)=(100, 60, 148)

It is assumed that pixels obtained by converting the RGB value of the two pixels A1 and A2 into YUV values are the following pixels B1 and B2.

Pixel B1 (Y, U, V)=(82, 97, 13)
Pixel B2 (Y, U, V)=(82, 37, 13)

A difference in YUV-U between the pixel B1 and the pixel B2 is 60 (=97-37) and the additional information is determined on the basis of the difference between the U components. In a case where the "auto" mode for automatically adjusting the white balance (auto white balance adjustment) is set, it is determined that "red fogging" has occurred. As a result, the R values of the pixels A1 and A2 are decreased and the G and B values of the pixels A1 and A2 are increased. It is assumed that the pixels whose R, G, and B values have been changed are pixels C1 and C2. The RGB values of the pixels C1 and C2 are as follows.

Pixel C1 (R, G, B)=(68, 58, 255)
Pixel C2 (R, G, B)=(68, 90, 255)

It is assumed that pixels obtained by converting the RGB values of the two pixels C1 and C2 into YUV values are the following pixels D1 and D2.

Pixel D1 (Y, U, V)=(84, 96, −11)
Pixel D2 (Y, U, V)=(102, 86, −24)

A difference in YUV-U between the pixel D1 and the pixel D2 is 10 (=96−86) and is less than 60 that is the difference in YUV-U between the pixel B1 and the pixel B2. As such, in a case where the white balance is automatically adjusted (auto white balance adjustment), there is a concern that the amount of modulation of a necessary color will not be obtained in some pixels during the multiplexing decoding process.

For this reason, in this embodiment, the white balance is adjusted during the multiplexing decoding process, on the basis of an adjustment value corresponding to the light source during the multiplexing decoding process which is assumed in advance during the multiplexing encoding process, so as to correspond to the light source. The adjustment value corresponding to the assumed light source may be set as a default value. In general, in a case where an image is captured by a camera, the type of light source is automatically recognized and the white balance is automatically adjusted (auto white balance adjustment) according to the type of light source. In this embodiment, the auto white balance adjustment function is not used during white balance adjustment in the multiplexing decoding process.

In general white balance adjustment, a color temperature which represents the color of light with temperature is used and a Kelvin value is used as the color temperature. For example, in a case where the light source is sunlight under the clear sky, the color temperature is set to 6500 Kelvin (K). In a case where the light source is sunlight at sunset, the color temperature is set to 3500 K. In general auto white balance adjustment, a light source is automatically estimated and the Kelvin value as the color temperature is set according to the light source. In white balance adjustment, the RGB values are corrected on the basis of the amount of gain corresponding to the set Kelvin value.

In this embodiment, for example, it is assumed that the color temperature of the light source in a case where the image of the printed matter C is captured is 5500 Kelvin (K). When the printed matter C is subjected to the multiplexing encoding process, the white balance setting unit 1701 sets the color temperature to 5500 Kelvin (K). That is, the white balance is adjusted on the basis of the color temperature corresponding to the light source during the multiplexing decoding process which is assumed during the multiplexing encoding process. In general, the printed matter C subjected to the multiplexing encoding process is used in association with an application for performing the multiplexing decoding process for the printed matter C. In addition, light source information related to the light source used during the capture of the image of the printed matter C may be stored in the camera-equipped mobile terminal 201 performing the multiplexing decoding process in advance, and the white balance setting unit 1701 may set the color temperature using the stored light source information. The color temperature set by the white balance setting unit 1701 is transmitted to the color adjustment unit 802 illustrated in FIG. 18.

(2-2) Color Adjustment Unit

The color adjustment unit 802 illustrated in FIG. 18 adjusts the gain of the RGB values of the captured image of the printed matter C on the basis of the color temperature received from the white balance setting unit 1701. In recent years, as the camera-equipped mobile terminal 201, there has been a mobile terminal having a function which enables the user to manually set the type of light source and adjusts the gain of the RGB values of a captured image according to the set type of light source to adjust the white balance. In this embodiment, in a case where the multiplexing decoding process is performed using the function of the camera-equipped mobile terminal 201, it is possible to adjust the white balance on the basis of the color temperature set by the white balance setting unit 1701.

(2-3) Effect of this Embodiment

In a case where the auto white balance adjustment function is used during the multiplexing decoding process, it may be difficult to read the additional information. In this embodiment, it is possible to reliably read the additional information by adjusting the white balance during the multiplexing decoding process, on the basis of the color temperature corresponding to the light source during the multiplexing decoding process which is assumed during the multiplexing encoding process. In the case of the camera-equipped mobile terminal 201 with a function of automatically adjusting the white balance (auto white balance adjustment function), the auto white balance adjustment function is turned off during the multiplexing decoding process. In a case where the image of the printed matter is captured with the auto white balance adjustment function turned off, it is possible to prevent a change in the color of the captured image and to stabilize an additional information reading operation.

Second Embodiment

In the first embodiment, it is possible to reliably read the additional information by adjusting the white balance during the capture of the image of the printed matter C so as to correspond to the light source during the multiplexing decoding process which is assumed during the multiplexing encoding process. In the first embodiment, a case where an image, in which a specific color is dominant, has been printed in the printed matter C is assumed. In this case, the white balance is not automatically adjusted (auto white balance adjustment is not performed). However, when the image of the printed matter C is captured, the capture of the image may be affected by both the color of the print image and a capturing environment. In this case, it is necessary to adjust the white balance according to the light source in the capturing environment. For example, in a case where the image of the printed matter C is captured under a light source that emits red light, the entire captured image looks red. In this case, there is a concern that the entire print image will remain red even in a case where the white balance is adjusted.

For this reason, in this embodiment, in a case where the image of the printed matter C is captured in the multiplexing decoding process, the printed matter C is actively illuminated. In recent years, as the camera-equipped mobile terminal 201, there has been a mobile terminal which has an LED light as a light source 212 illuminating an object, as illustrated in FIG. 2. In general, the color temperature of the light source 212 is about 5500 Kelvin (K) and is set to a value between the color temperature of light from a white fluorescent lamp and the color temperature of sunlight under the clear sky. In addition, in recent years, as the camera-equipped mobile terminal 201, there has been a mobile terminal which includes an LED light of a plurality of colors as the light source 212. In this case, it is possible to control illumination light. Such a light source which is controlled by a light control function is assumed in the multiplexing encoding process in advance. In the multiplexing decoding process, it is possible to capture the image of the printed matter C under the assumed light source and to adjust the white balance according to the light source. In this case, as the color temperature corresponding to the assumed light source 212, for example, 5500 Kelvin (K) may be set as the default value. In addition, the light source 212 provided in the camera-equipped mobile terminal 201 can be operated by the user at any time. When a camera mechanism in the camera-equipped mobile terminal 201 is used, it is possible automatically illuminate the object.

As such, in this embodiment, during the multiplexing decoding process, the image of the printed matter C is captured while the printed matter C is actively illuminated by a predetermined light source. The predetermined light source is assumed in advance and the white balance is adjusted so as to correspond to the light source. In this way, it is possible to reduce the influence of a capturing environment. Therefore, it is possible to appropriately adjust the white balance and to reliably read the additional information.

Other Embodiments

In the above-described embodiments, the white balance is adjusted on the basis of the set value of the color temperature corresponding to the assumed light source. However, the invention is not limited thereto. For example, in a case where a light source assumed during the multiplexing encoding process has a given color temperature range, it is not necessary to uniquely set the color temperature of the light source. For example, the color temperature of the light source may be set in the range of 5000 Kelvin (K) to 6000 K. In recent years, as the camera-equipped mobile terminal 201, there has been a mobile terminal which can designate the color temperature range of the light source in order to adjust the white balance during capturing. The white balance may be adjusted in the designated color temperature range of the light source.

In addition, the version of software for performing the multiplexing encoding process is likely to be different. In this case, the configuration in which the color temperature of the light source is uniquely set as a white balance adjustment value does not have versatility. Therefore, the white balance adjustment value may be switched under a predetermined condition. For example, the color temperature as the adjustment value may be switched according to the version of the software for performing the multiplexing encoding process. In addition, in a case where the image of the printed matter C is captured, the white balance adjustment value may be switched for each version of the software for performing the multiplexing decoding process. Furthermore, for example, a marker may be read from the printed matter C, the version of the software for performing the multiplexing decoding process may be determined on the basis of the reading result, and the white balance adjustment value may be switched according to the version. In addition, the white balance adjustment value may be switched using the analysis information of the characteristics of the print image of the printed matter C.

In the present invention, in order to capture an image in which the additional information has been embedded by color modulation and to extract the additional information from the captured image with high accuracy, the white balance of the captured image may be adjusted on the basis of an adjustment value which is associated with the image having the additional information embedded therein. The adjustment value may be a predetermined default value for the image having the additional information embedded therein (additional-information-embedded image) or may vary depending on the modulation conditions of a color component in the additional-information-embedded image. In addition, an allowable adjustment range of the white balance of the additional-information-embedded image may be set on the basis of the adjustment value associated with the image having the additional information embedded therein and the white balance may be automatically adjusted by an auto white balance adjustment function in the allowable adjustment range.

Furthermore, the white balance of the additional-information-embedded image may be adjusted on the basis of a plurality of adjustment values that can be selected. In this case, the adjustment value can be selected on the basis of at least one of the version of an application for generating the image data in which at least a color component has been modulated according to the additional information and the analysis result of the characteristics of the additional-information-embedded image. The version of the application can be determined on the basis of, for example, information printed as a marker in the printed matter together with the additional-information-embedded image.

The above-described embodiments are examples of the configuration for obtaining the effect of the present invention and structures that can obtain the same effect as described above using other similar methods or different parameters are also included in the scope of the present invention. In addition, the present invention can be applied to a system including a plurality of apparatuses (for example, a host computer, an interface device, a reader, and a printer) and an apparatus including one device (for example, a printer, a copier, and a facsimile).

The object of the present invention can be achieved by the following configuration. First, a storage medium (or a printing medium) in which a program code of software for implementing the functions of the above-described embodiments has been stored is provided to a system or an apparatus. Then, a computer (a CPU or an MPU) of the system or the apparatus reads and executes the program code stored in the storage medium. In this case, the program code read from the storage medium implements the functions of the above-described embodiments, and the program code and the storage medium storing the program code form the present invention. In addition, the present invention is not limited to the configuration in which the computer executes the read program code to implement the functions of the above-described embodiments. For example, the present invention includes a case in which an operating system (OS) that operates in the computer executes some or all of the actual processes on the basis of an instruction from the program code and the functions of the above-described embodiments are implemented by the processes.

In addition, the object of the present invention can be achieved by the following configuration. First, the program code read from the storage medium is written to a memory that is provided in a function expansion card inserted into the computer or a memory that is provided in a function expansion unit connected to the computer. Then, for example, a CPU that is provided in the function expansion card or the function expansion unit executes some or all of the actual processes on the basis of an instruction from the program code, and the functions of the above-described embodiments are implemented by the processes.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-126764, filed Jun. 28, 2017, which is hereby incorporated by reference wherein in its entirety.

What is claimed is:

1. An information processing apparatus comprising:
one or more memories; and
one or more processors that, in cooperation with the one or more memories, serve as
an acquiring unit configured to acquire a captured image obtained by capturing using a capturing device configured to capture an image of an object;
an adjustment unit configured to adjust a white balance of the acquired image and having an auto white balance function of adjusting white balance of an image based on information about a light source sensed in capturing the image;
a processing unit configured to process image data for the acquired image to extract additional information in the image; and
a storing unit configured to store an image based on the captured image,
wherein, in a first process in which multiplexed additional information is not extracted from the acquired image by the processing unit, the adjustment unit adjusts a white balance of the acquired image using the auto white balance function and an image based on the captured image that is adjusted using the auto white balance function is stored in the storing unit, and
in a second process in which the multiplexed additional information is extracted from the acquired image by the processing unit, the image based on the captured image is stored in the storing unit without using the auto white balance function.

2. The information processing apparatus according to claim 1, wherein, in the second process, the adjustment unit adjusts the white balance of the acquired image on the basis of a predetermined adjustment value and an image based on the captured image that is adjusted on the basis of the predetermined adjustment value is stored in the storing unit.

3. The information processing apparatus according to claim 2, wherein the predetermined adjustment value varies depending on a modulation condition of a color component for multiplexing the additional information in the captured image.

4. The information processing apparatus according to claim 2, wherein the adjustment unit adjusts the white balance of the captured image on the basis of a plurality of adjustment values that are selectable.

5. The information processing apparatus according to claim 1, further comprising the capturing device.

6. The information processing apparatus according to claim 5, wherein the capturing device includes a light source that illuminates an image being captured, and the adjustment unit adjusts the white balance of the embedded image on the basis of an adjustment value corresponding to a color temperature of the light source.

7. An information processing method comprising:
acquiring a captured image obtained by capturing using a capturing device configured to capture an image of an object;
adjusting a white balance of the acquired image using an adjustment unit having an auto white balance function of adjusting white balance of an image based on information about a light source sensed in capturing the image;
processing image data for the acquired image to extract additional information in the image; and
storing an image based on the captured image;
wherein, in a first process in which multiplexed additional information is not extracted from the acquired image by the processing step, the adjustment step adjusts a white balance of the acquired image using an auto white balance function and an image based on the captured image that is adjusted using the auto white balance function is stored in the storing step and,
in a second process in which the multiplexed additional information is extracted from the acquired image by the processing step, the image based on the captured image is stored in the storing step without using the auto white balance function.

8. The information processing method according to claim 7, wherein, in the second process, the white balance of the acquired image is adjusted by the adjustment step on the basis of a predetermined adjustment value and an image based on the captured image that is adjusted on the basis of the predetermined adjustment value is stored in the storing step.

9. The information processing method according to claim 8, wherein the predetermined adjustment value varies depending on a modulation condition of a color component for multiplexing the additional information in the captured image.

10. The information processing method according to claim 8, wherein the white balance of the captured image is adjusted by the adjustment step on the basis of a plurality of adjustment values that are selectable.

11. The information processing method according to claim 7, further comprising capturing the object using the capturing device.

12. The information processing method according to claim 11, wherein the capturing device includes a light source that illuminates an image being captured, and the adjustment step adjusts the white balance of the embedded image on the basis of an adjustment value corresponding to a color temperature of the light source.

13. A non-transitory computer-readable storage medium storing a program which causes a computer to execute an information processing method, the information processing method comprising:
  acquiring a captured image obtained by capturing using a capturing device configured to capture an image of an object;
  adjusting a white balance of the acquired image using an adjustment unit having an auto white balance function of adjusting white balance of an image based on information about a light source sensed in capturing the image;
  processing image data for the acquired image to extract additional information in the image; and
  storing an image based on the captured image;
  wherein, in a first process in which multiplexed additional information is not extracted from the acquired image by the processing step, the adjustment step adjusts a white balance of the acquired image using an auto white balance function and an image based on the captured image that is adjusted using the auto white balance function is stored in the storing step and,
  in a second process in which the multiplexed additional information is extracted from the acquired image by the processing step, the image based on the captured image is stored in the storing step without using the auto white balance function.

14. The non-transitory computer-readable storage medium according to claim 13, wherein, in the second process, the white balance of the acquired image is adjusted by the adjustment step on the basis of a predetermined adjustment value and an image based on the captured image that is adjusted on the basis of the predetermined adjustment value is stored by the storing step.

15. The non-transitory computer-readable storage medium according to claim 14, wherein the predetermined adjustment value varies depending on a modulation condition of a color component for multiplexing the additional information in the captured image.

16. The non-transitory computer-readable storage medium according to claim 14, wherein the white balance of the captured image is adjusted by the adjustment step on the basis of a plurality of adjustment values that are selectable.

* * * * *